United States Patent
Kim et al.

(10) Patent No.: US 10,966,192 B2
(45) Date of Patent: Mar. 30, 2021

(54) CONTROL CHANNEL TRANSMISSION METHOD FOR SUPPORTING MULTI-CARRIERS IN NEXT GENERATION COMMUNICATION SYSTEM, AND DEVICE THEREFOR

(71) Applicant: LG Electronics Inc., Seoul (KR)

(72) Inventors: Youngtae Kim, Seoul (KR); Seonwook Kim, Seoul (KR); Duckhyun Bae, Seoul (KR); Huayue Song, Seoul (KR); Joonkui Ahn, Seoul (KR); Suckchel Yang, Seoul (KR); Yunjung Yi, Seoul (KR); Hyunho Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/871,727

(22) Filed: May 11, 2020

(65) Prior Publication Data
US 2020/0314820 A1 Oct. 1, 2020

Related U.S. Application Data

(63) Continuation of application No. PCT/KR2018/014179, filed on Nov. 19, 2018.
(Continued)

(51) Int. Cl.
*H04W 72/04* (2009.01)

(52) U.S. Cl.
CPC ..... *H04W 72/042* (2013.01); *H04W 72/0453* (2013.01)

(58) Field of Classification Search
CPC .......... H04W 72/042; H04W 72/0453
See application file for complete search history.

(56) References Cited

U.S. PATENT DOCUMENTS

| 2016/0007374 A1* | 1/2016 | Lee | H04W 72/0446 370/336 |
| 2016/0044638 A1* | 2/2016 | Gao | H04L 1/1896 370/280 |

FOREIGN PATENT DOCUMENTS

| KR | 101590069 | 2/2016 |
| KR | 1020160133013 | 11/2016 |
| KR | 101717522 | 3/2017 |

OTHER PUBLICATIONS

Huawei, HiSilicon, "HARQ/CSI feedback and scheduling timing for SUL," R1-1717097, 3GPP TSG RAN WG1 Meeting 90bis, Prague, Czech Republic, dated Oct. 9-13, 2017, 7 pages.
(Continued)

*Primary Examiner* — Kyaw Z Soe
(74) *Attorney, Agent, or Firm* — Fish & Richardson P.C.

(57) ABSTRACT

Disclosed in the present application is a method by which a terminal, set by a first uplink carrier, receives downlink control information from a base station in a wireless communication system. Particularly, the method comprises the steps of: receiving setting information of a second uplink carrier through an upper layer; receiving, from the base station, the downlink control information for transmission of an uplink signal through the first uplink carrier or the second uplink carrier; and transmitting, to the base station, the uplink signal on the basis of the downlink control information, wherein the last bit of padding bits of the downlink control information is indicator information indicating either the first uplink carrier or the second uplink carrier.

12 Claims, 13 Drawing Sheets

Related U.S. Application Data

(60) Provisional application No. 62/656,926, filed on Apr. 12, 2018, provisional application No. 62/630,335, filed on Feb. 14, 2018, provisional application No. 62/616,520, filed on Jan. 12, 2018, provisional application No. 62/593,258, filed on Dec. 1, 2017, provisional application No. 62/591,696, filed on Nov. 28, 2017, provisional application No. 62/590,496, filed on Nov. 24, 2017, provisional application No. 62/588,214, filed on Nov. 17, 2017.

(56) References Cited

OTHER PUBLICATIONS

LG Electronics, "Discussion on carrier aggregation for NR," R1-1717973, 3GPP TSG RAN WG1 Meeting 90bis, Prague, CZ, dated Oct. 9-13, 2017, 9 pages.

Nokia, Nokia Shanghai Bell, "Resource allocation for Autonomous UL Access," R1-1717240, 3GPP TSG-RAN WG1 Meeting #bis, Prague, Czech Republic, dated Oct. 9-13, 2017, 4 pages.

PCT International Search Report and Written Opinion in International Application No. PCT/KR2018/014179, dated Feb. 22, 2019, 17 pages (with English translation).

Qualcomm Incorporated, "Resource allocation for autonomous UL access," R1-1718122, Revision of R1-1713026, 3GPP TSG RAN WG1 #90bis, Prague, Czech, dated Oct. 9-13, 2017, 4 pages.

Samsung, "On LTE-NR Coexistence," R1-1717691, 3GPP TSG RAN WG1 Meeting #90b, Prague, CZ, dated Oct. 9-13, 2017, 3 pages.

Extended European Search Report in European Application No. 18878745.1, dated Oct. 27, 2020, 11 pages.

Huawei, HiSilicon, "WF on SUL operations," R1-1719112, 3GPP TSG RAN WG1 Meeting 90bis, Prague, CZ, dated Oct. 9-13, 2017, 2 pages.

* cited by examiner

FIG. 1
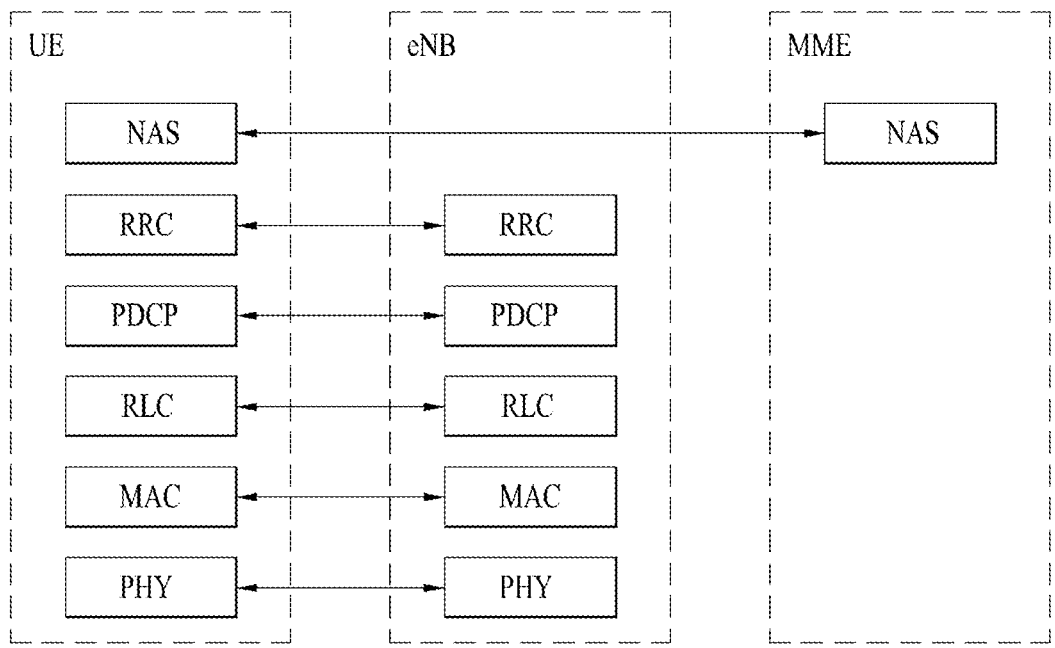
(A) CONTROL-PLANE PROTOCOL STACK
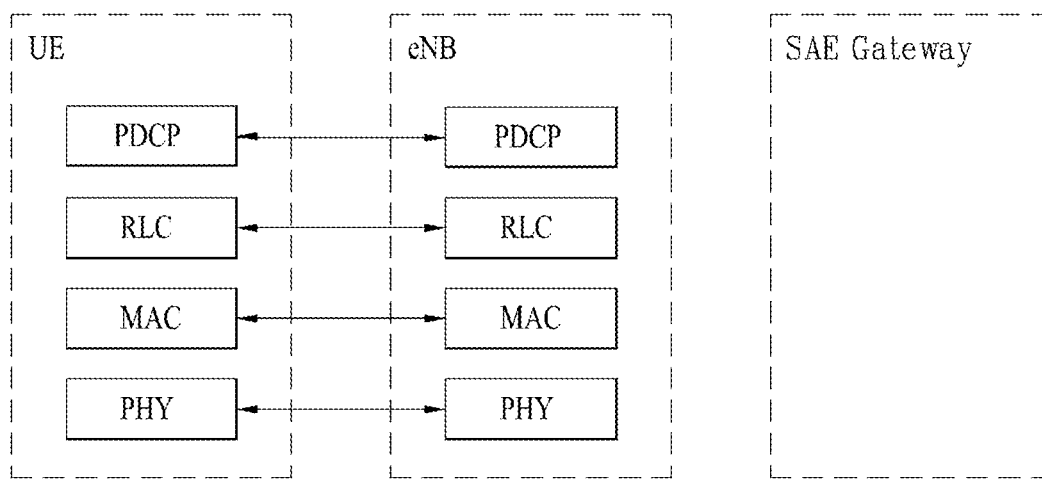
(B) USER-PLANE PROTOCOL STACK

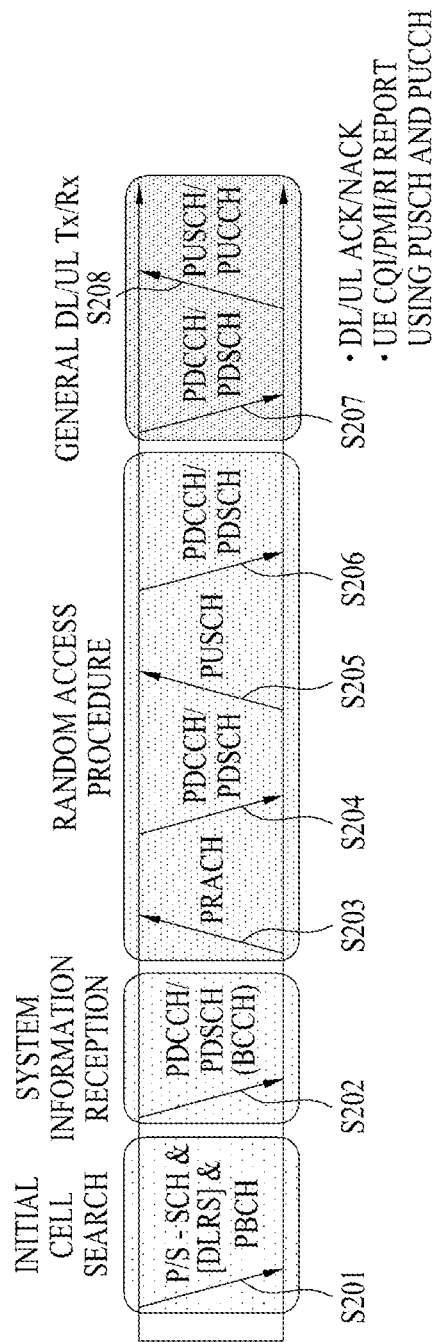

1TX or 2TX

4 TX

FIG. 10
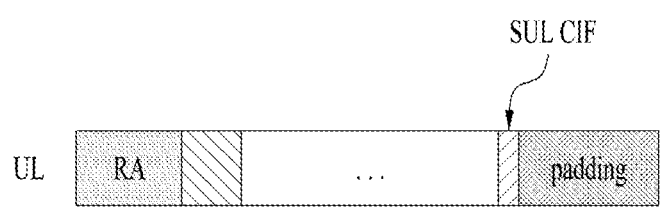
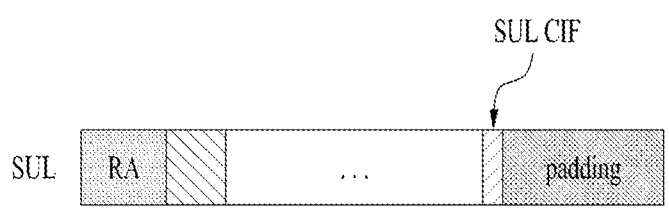

FIG. 11
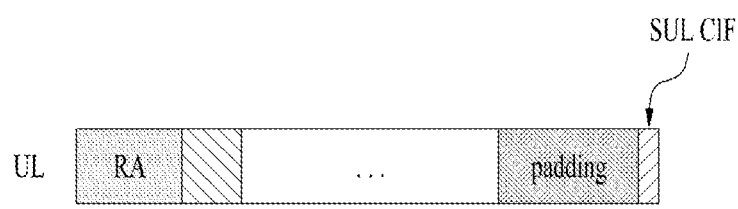
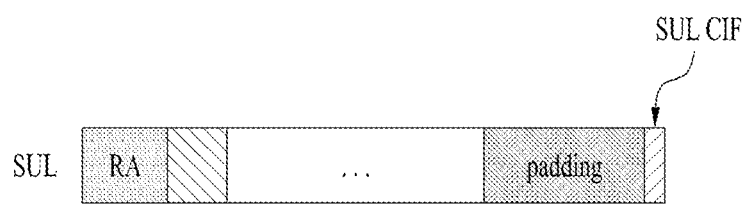

CONTROL CHANNEL TRANSMISSION METHOD FOR SUPPORTING MULTI-CARRIERS IN NEXT GENERATION COMMUNICATION SYSTEM, AND DEVICE THEREFOR

CROSS-REFERENCE TO RELATED APPLICATIONS

This application is a continuation of International Application No. PCT/KR2018/014179, filed on Nov. 19, 2018, which claims the benefit of U.S. Provisional Application No. 62/588,214, filed on Nov. 17, 2017, 62/590,496, filed on Nov. 24, 2017, 62/591,696, filed on Nov. 28, 2017, 62/593,258, filed on Dec. 1, 2017, 62/616,520, filed on Jan. 12, 2018, 62/630,335, filed on Feb. 14, 2018 and 62/656,926, filed on Apr. 12, 2018. The disclosures of the prior applications are incorporated by reference in their entirety.

TECHNICAL FIELD

The present disclosure relates to a wireless communication system, and more particularly, to a method of transmitting a control channel for multi-carrier support in a next generation communication system and apparatus therefor.

BACKGROUND ART

As more and more communication devices demand greater communication traffic as times go by, the next generation 5G system, which is wireless broadband communication, is being required over the existing LTE systems. In the next generation 5G system named NewRAT, communication scenarios are classified into Enhanced Mobile BroadBand (eMBB), Ultra-reliability and low-latency communication (URLLC), Massive Machine-Type Communications (mMTC), etc.

Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

SUMMARY

Based on the aforementioned discussion, it is intended to propose a method of transmitting a control channel for multi-carrier support in a next generation communication system and apparatus therefor.

In one technical aspect of the present disclosure, provided herein is a method of receiving a downlink control information from a base station by a user equipment having a first uplink carrier configured in a wireless communication system, the method including receiving configuration information of a second uplink carrier through a higher layer, receiving the downlink control information for transmission of an uplink signal through the first or second uplink carrier from the base station, and transmitting the uplink signal to the base station based on the downlink control information, wherein a last bit among padding bits of the downlink control information may include an indicator information indicating either the first uplink carrier or the second uplink carrier.

In another technical aspect of the present disclosure, provided herein is a user equipment having a first uplink carrier configured therefor in a wireless communication system, the user equipment including a memory and a processor connected to the memory, wherein the processor may be configured to receive configuration information of a second uplink carrier through a higher layer, receive the downlink control information for transmission of an uplink signal through the first or second uplink carrier from the base station, and transmit the uplink signal to the base station based on the downlink control information and wherein a last bit among padding bits of the downlink control information may be an indicator information indicating either the first uplink carrier or the second uplink carrier.

Preferably, a subcarrier spacing of the second uplink carrier is different from that of the first uplink carrier. Preferably, the user equipment may perform a step of receiving configuration information on availability of transmission of the uplink signal through the second uplink carrier. More preferably, the downlink control information may include the indicator information if the transmission of the uplink signal through the second uplink carrier is configured as available.

In further technical aspect of the present disclosure, provided herein is a method of transmitting a downlink control information to a user equipment having a first uplink carrier configured therefor by a base station in a wireless communication system, the method including transmitting configuration information of a second uplink carrier through a higher layer, transmitting the downlink control information for transmission of an uplink signal through the first or second uplink carrier to the user equipment, and receiving the uplink signal based on the downlink control information from the user equipment, wherein a last bit among padding bits of the downlink control information may be an indicator information indicating either the first uplink carrier or the second uplink carrier.

In another further one technical aspect of the present disclosure, provided herein is a base station transmitting a downlink control information to a user equipment having a first uplink carrier configured therefor to a user equipment in a wireless communication system, the base station including a memory and a processor connected to the memory, wherein the processor may be configured to transmit configuration information of a second uplink carrier through a higher layer, transmit the downlink control information for transmission of an uplink signal through the first or second uplink carrier to the user equipment, and receive the uplink signal based on the downlink control information from the user equipment and wherein a last bit among padding bits of the downlink control information may be an indicator information indicating either the first uplink carrier or the second uplink carrier.

According to an embodiment of the present disclosure, a control channel for multi-carrier support in a next generation communication system can be transmitted more efficiently.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

FIG. 1 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 2 illustrates physical channels and a general signal transmission method using the physical channels in a 3GPP system.

FIG. 10 and FIG. 11 show examples of adding SUL CIF to a fallback DCI according to an embodiment of the present disclosure.

DETAILED DESCRIPTION

Figure 3A:
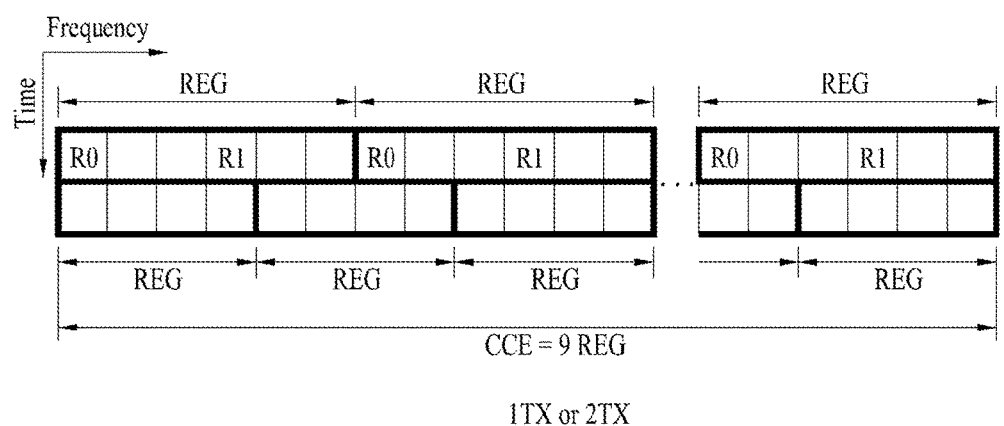
FIGS. 3A and 3B are diagrams showing a resource unit used in configuring a downlink control channel in LTE system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

Further, the term 'Base Station (BS)' may be used to cover the meanings of terms including Remote Radio Head (RRH), eNB, Transmission Point (TP), Reception Point (RP), relay, etc.

The 3GPP based communication standard defines downlink physical channels corresponding to resource elements carrying information originating from an upper layer and downlink physical channels corresponding to resource elements failing to carry information originating from the upper layer despite being used by a physical layer. For example, Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH) and Physical Hybrid ARQ Indicator Channel (PHICH) are defined, and a resource signal and a synchronization signal are defined as downlink physical signals. A Reference Signal (RS) means a signal of a predefined special waveform known to both a gNB and a UE and may be referred to as a pilot. For example, a cell-specific RS, a UE-specific RS (UE-RS), a positioning RS (PRS) and a Channel State Information-R (CSI-RS) are defined as downlink reference signals. The 3GPP LTE/LTE-A standard defines uplink physical channels corresponding to resource elements carrying information originating from an upper layer and uplink physical channels corresponding to resource elements failing to carry information originating from the upper layer despite being used by a physical layer. For example, Physical Uplink Shared Channel (PUSCH), Physical Uplink Control Channel (PUCCH) and Physical Random Access Channel (PRACH) are defined as uplink physical channels, and Demodulation Reference Signal (DMRS) for an uplink control/data signal and Sounding Reference Signal (SRS) used for uplink channel measurement are defined.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present disclosure, particularly, a time-frequency resource or Resource Element (RE) allocated or belonging to PDCCH/PCFICH/PHICH/ PDSCH/PUCCH/PUSCH/PRACH is referred to as PDCCH/ PCFICH/PHICH/PDSCH/PUCCH/PUSCH/PRACH RE or PDCCH/PCFICH/PHICH/PDSCH/PUCCH/PUSCH/ PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/ PDSCH by an eNB is equivalent to transmission of downlink data/control information through or on PDCCH/ PCFICH/PHICH/PDSCH.

Hereinafter, a CRS/DMRS/CSI-RS/SRS/UE-RS allocated or configured OFDM symbol/subcarrier/RE will be referred to as a CRS/DMRS/CSI-RS/SRS/UE-RS symbol/ carrier/subcarrier/RE. For example, a Tracking RS (TRS) allocated or configured OFDM symbol will be referred to as a TRS symbol, a TRS allocated or configured subcarrier will be referred to as a TRS symbol, a TRS allocated or configured subcarrier will be referred to as a TRS subcarrier, and a TRS allocated or configured RE will be referred to as a TRS RE. Moreover, a subframe configured for TRS transmission will be referred to as a TRS subframe. A broadcast signal transmitted subframe will be referred to as a broadcast subframe or a PBCH subframe, and a synchronization signal (e.g., PSS and/or SSS) transmitted subframe will be referred to as a synchronization signal subframe or a PSS/SSS subframe. A PSS/SSS allocated or configured OFDM symbol/subcarrier/RE will be referred to as a PSS/SSS symbol/ subcarrier/RE.

In the present disclosure, a CRS port, a UE-RS port, a CSI-RS port and a TRS port refer to an antenna port configured to transmit a CRS, an antenna port configured to transmit a UE-RS, an antenna port configured to transmit a CSI-RS and an antenna port configured to transmit a TRS, respectively. Antenna ports configured to transmit CRSs may be distinguished from each other by positions of REs occupied by the CRS according to CRS ports, respectively. Antenna ports configured to transmit UE-RSs may be distinguished from each other by positions of REs occupied by the UE-RS according to UE-RS ports, respectively. Antenna ports configured to transmit CSI-RSs may be distinguished from each other by positions of REs occupied by the CSI-RS according to CSI-RS ports, respectively. Therefore, the term 'CRS/UE-RS/CSI-RS/TRS port' may be used as a term referring to a pattern of REs occupied by a CRS/UE-RS/CSI-RS/TRS in a predetermined resource region.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3B:
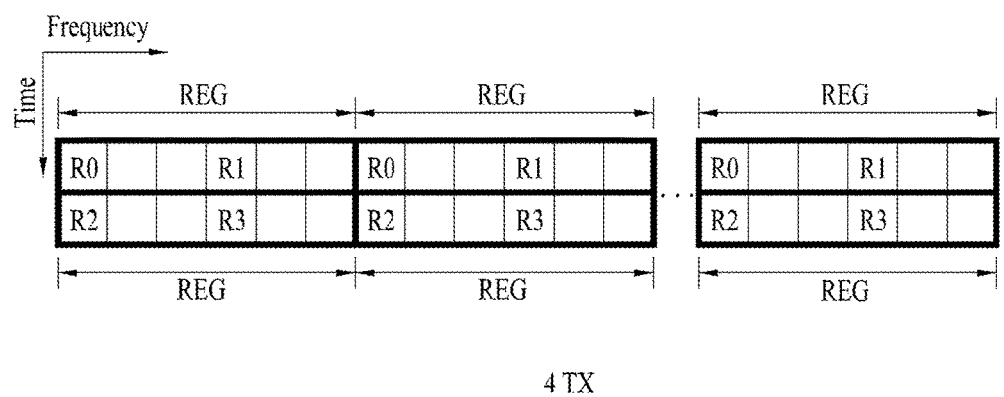

FIGS. 3A and 3B are diagrams showing a resource unit used in configuring a downlink control channel in an LTE system. Particularly, FIG. 3A shows a case that the number of Tx antenna(s) of a base station is 1 or 2 and FIG. 3B shows a case that the number of Tx antennas of a base station is 4. A Reference Signal (RS) pattern is different depending on the number of Tx antenna(s) only but a configuring method of a resource unit related to a control channel is identical.

Referring to FIGS. 3A and 3B, a basic resource unit of a DownLink (DL) control channel is Resource Element Group (REG). The REG is configured with 4 neighboring Resource Elements (REs) in an RS excluded state. The REG is denoted by a bold line. PCFICH and PHICH include 4 REGs and 3 REGs, respectively. PDCCH is configured in unit of Control Channel Elements (CCEs) and one CCE includes 9 REGs.

In order for a UE to check whether PDCCH configured with L CCEs is transmitted to itself, the UE is configured to check $M^{(L)}(\geq L)$ contiguous CCEs or CCEs arranged by a specific rule. A value of L the UE should consider may become plural. CCE sets the UE should check for PDCCH reception are called a search space. For example, an LTE system defines a search space like Table 1.

TABLE 1

| Search space $S_k^{(L)}$ | | Number of PDCCH candidates $M^{(L)}$ |
|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Here, a CCE aggregation level L indicates the number of CCEs configuring PDCCH, $S_k^{(L)}$ indicates a search space of the CCE aggregation level L, and $M^{(L)}$ is the number of PDCCH candidates that should be monitored in the search space of the aggregation level L.

A search space may be categorized into a UE-specific search space allowing an access for a specific UE only and a common search space allowing an access for all UEs within a cell. A UE monitors a common search space of which CCE aggregation level is 4 or 8 and a UE-specific search space of which CCE aggregation level is 1, 2, 4 or 8. The common search space and the UE-specific search space may overlap each other.

Moreover, a position of a first CCE (having a smallest index) in a PDCCH search space given to a random UE for each CCE aggregation level value changes in each subframe depending on a UE. This is named PDCCH search space hashing.

The CCE may be distributed on a system band. Specifically, a plurality of logically contiguous CCEs may be inputted to an interleaver, and the interleaver performs a function of mixing a plurality of the inputted CCEs in REG unit. Hence, a frequency/time resource configuring a single CCE is distributed in a manner of being physically scattered in the whole frequency/time domain within a control region of a subframe. Eventually, although a control channel is configured in CCE unit, interleaving is performed in REG unit. Hence, frequency diversity and interference randomization gain can be maximized.

Figure 4:
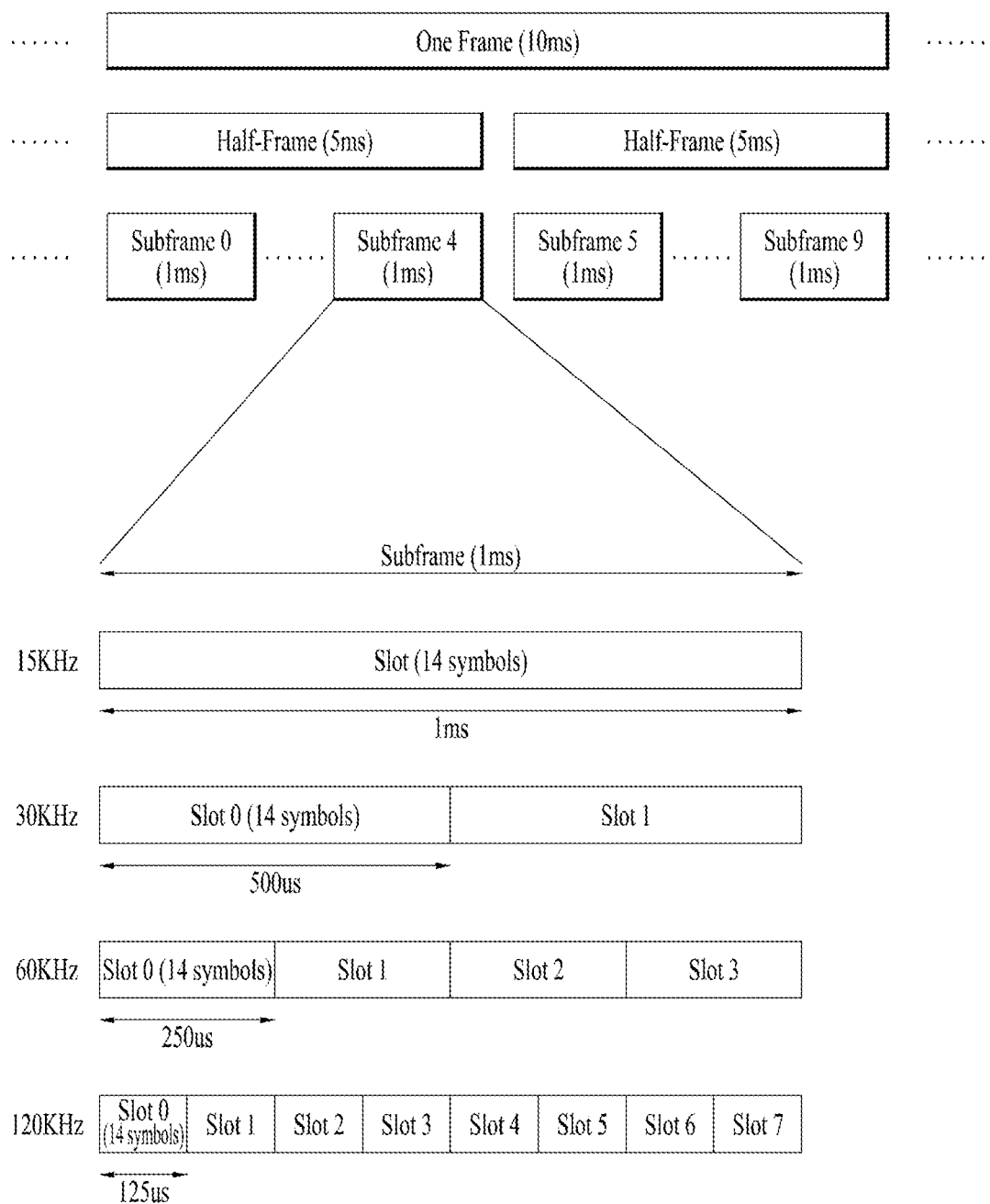
FIGS. 4 to 6 are diagrams to describe structures of a radio frame and slot used in NR system.

FIG. 4 shows an example of a structure of a radio frame used in NR.

UL/DL transmission in NR is configured with a frame. A radio frame has a length of 10 ms and is defined as 2 5 ms Half-Frames (HFs). The half-frame is defined as 5 1 ms SubFrames (SFs). A subframe is divided into one or more slots and the number of slots in the subframe depends of SubCarrier Spacing (SCS). Each slot includes 12 or 14 OFDM(A) symbols depending on a Cyclic Prefix (CP). When a normal CP is used, each slot includes 14 symbols. When an extended CP is used, each slot includes 12 symbols. Here, symbols may include OFDM symbols (or CP-OFDM symbols), SC-FDMA symbols (or DFT-s-OFDM symbols).

Table 2 exemplarily shows that the number of symbols per slot, the number of slots per frame, and the number of slots per subframe vary depending on SCS in case of using a normal CP.

TABLE 2

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 3 exemplarily shows that the number of symbols per slot, the number of slots per frame, and the number of slots per subframe vary depending on SCS in case of using an extended CP.

TABLE 3

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM(A) numerology (e.g., SCS, CP length, etc.) may be configured differently among a plurality of cells aggregated for a single UE. Accordingly, (absolute time) interval of a time resource (e.g., SF, slot or TTI) (referred to as Time Unit (TU) for clarity) configured with the same number of symbols may be configured differently among the aggregated cells.

Figure 5:
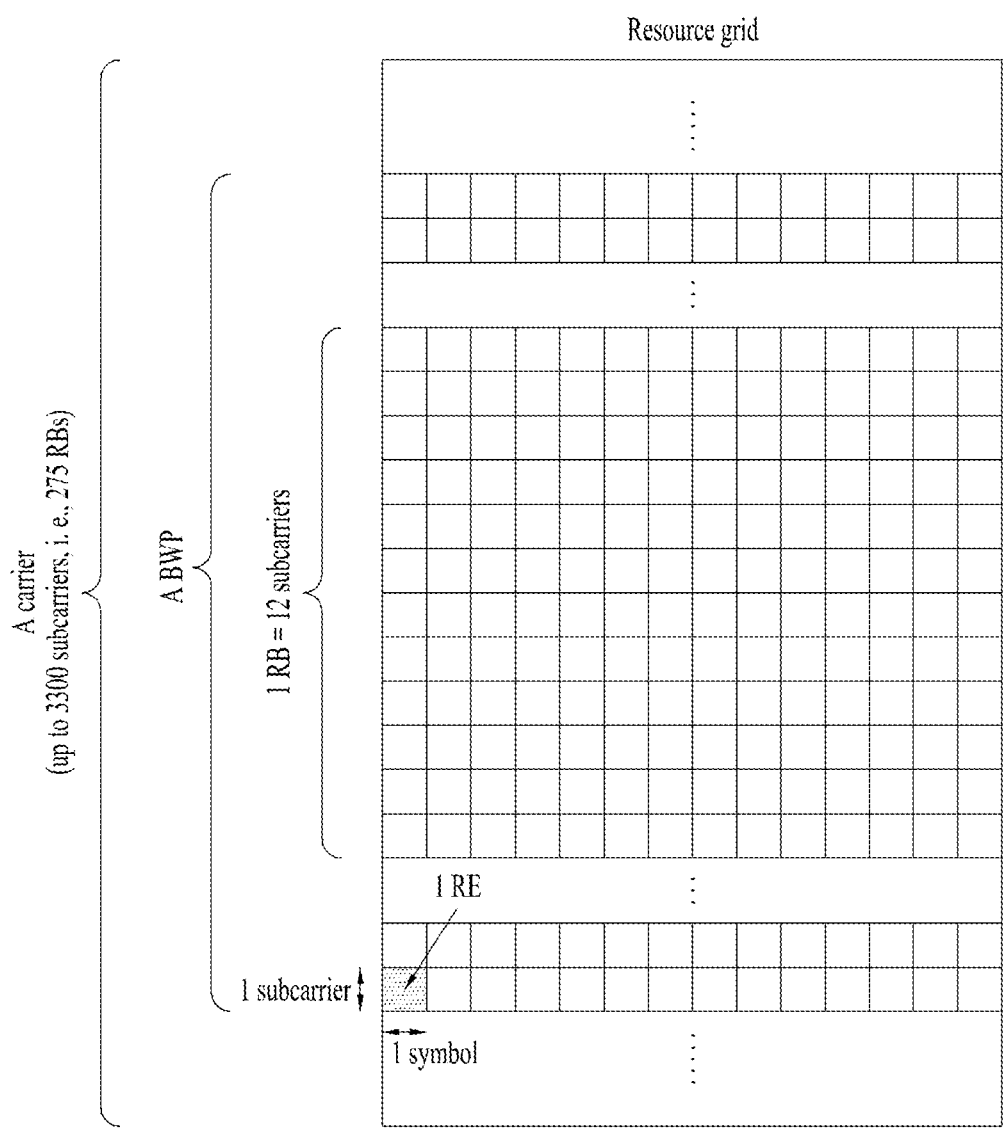

FIG. 5 exemplarily shows a slot structure of an NR frame. A slot includes a plurality of symbols in a time domain. For example, in case of a normal CP, a single slot includes 7 symbols. In case of an extended CP, a single slot includes 6 symbols. A carrier includes a plurality of subcarriers in a frequency domain. A Resource Block (RB) is defined as a plurality of contiguous subcarriers in the frequency domain. A BandWidth Part (BWP) is defined as a plurality of contiguous (P)RBs in the frequency domain and may correspond to one numerology (e.g., SCS, CP length, etc.). A carrier may include maximum N (e.g., 5) BWPs. Data communication is performed through an activated BWP, and a single BWP can be activated only for a single UE. Each element in a resource grid is referred to as a Resource Element (RE), and may have a single complex symbol mapped thereto.

Figure 6:
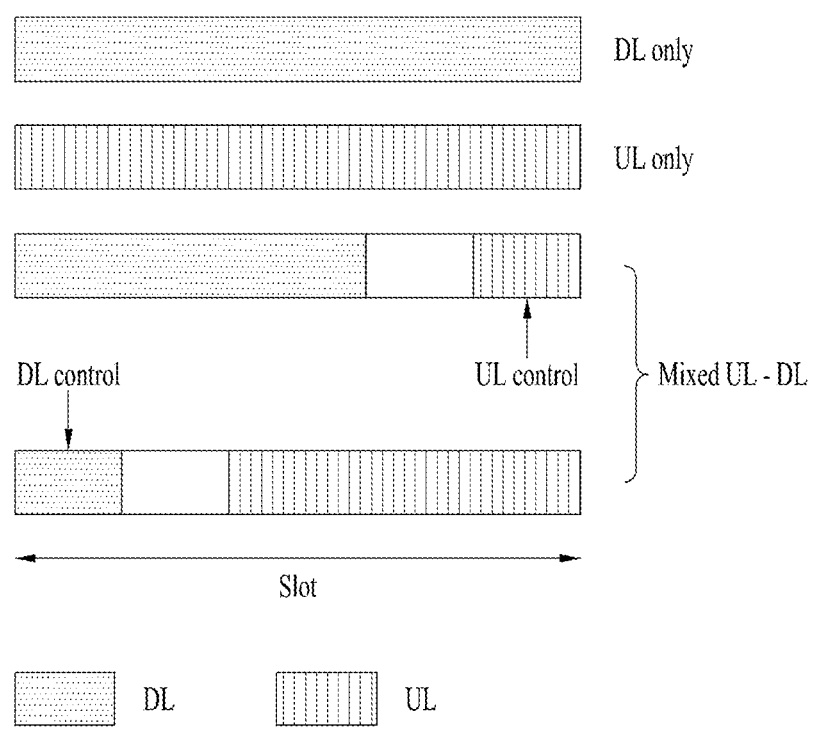

FIG. 6 shows a structure of a self-contained slot. In the NR system, a frame is characterized in having a self-contained structure that DL control channel, DL or UL data, UL control channel and the like can be included all in a single slot. For example, first N symbols in a slot may be used to transmit a DL control channel (hereinafter, DL control region), and last M symbols in the slot may be used to transmit a UL control channel (hereinafter, UL control region). N and M are integers equal to or greater than 0. A resource region (hereinafter, data region) located between the DL control region and the UL control region may be used for DL or UL data transmission. For example, the following configuration may be considered. Each interval is listed in order of time.

1. DL only configuration
2. UL only configuration
3. Mixed UL-DL configuration
DL region+GP (Guard Period)+UL control region
DL control region+GP+UL region
DL region: (i) DL data region, (ii) DL control region+DL data region UL region: (i) UL data region, (ii) UL data region+UL control region PDCCH may be transmitted in a DL control region, and PDSCH may be transmitted in a DL data region. PUCCH may be transmitted in a UL control region, and PUSCH may be transmitted in a UL data region. Downlink Control Information (DCI), e.g., DL data scheduling information, UL data scheduling information and the like may be transmitted on PDCCH. Uplink Control Information (UCI), e.g., Positive Acknowledgement/Negative Acknowledgement (ACK/NACK) information on DL data, Channel State Information (CSI), Scheduling Request (SR) and the like may be transmitted on PUCCH. GP provides a time gap in a process for a BS and UE to switch to Rx mode from Tx mode, and vice versa. Some symbols of a timing of switching from DL to UL in a subframe may be configured as a GP.

Meanwhile, the NR system is considering a scheme of using a ultrahigh frequency band (e.g., frequency band over 6 GHz) in order to transmit data to a multitude of users while maintain a high transmission rate using a wide frequency band. Yet, since the ultrahigh frequency band uses a too high frequency band, it is characterized in that signal attenuation due to a distance appears very rapidly. Therefore, in order to compensate for the rapid propagation attenuation characteristic, the NR system, which uses a frequency band over 6 GHz, uses a narrow beam transmission method of transmitting a signal by gathering energy not in omni-direction but in a specific direction. The NR system uses the narrow beam transmission method, thereby solving a problem of reduction of the coverage due to the rapid propagation attenuation. Yet, in case of providing a service using a single narrow beam only, a range for a single BS to provide a service is narrowed. Therefore, a BS may provide a service on broadband by gathering a multitude of narrow beams.

Since a wavelength is shortened on a ultrahigh frequency band, i.e., a millimeter Wave (mmW) band, a plurality of antenna elements may be installed in the same area. For example, in case of 30-GHz band having a wavelength of about 1 cm, total 100 antenna elements may be installed in 5 cm×5 cm panel with an 0.5-lamda interval in form of a 2-dimensional array. Hence, on the mmW band, a method of increasing a coverage using a plurality of antenna elements or raising a throughput is considered.

As a method of forming a narrow beam on a mmW band, a beamforming scheme, which increases energy in a specific direction only in a manner that a BS or UE transmits the same signal through a plurality of antennas using an appropriate phase difference, is mainly considered. The beamforming scheme may include a digital beamforming of generating a phase difference in a digital baseband signal, an analog beamforming of generating a phase difference in a modulated analog signal using a time delay (i.e., a cyclic shift), a hybrid beamforming using both a digital beamforming and an analog beamforming, etc. If a Transceiver Unit (TXRU) is provided to enable transmission poser and phase adjustment per antenna element, an independent beamforming per frequency resource is possible. Yet, if TXRUs are installed at all the 100 antenna elements, it may be less efficient in aspect of costs. Namely, the mmW band uses a number of antennas to compensate for the rapid propagation attenuation characteristic, and the digital beamforming needs an RF component (e.g., a digital-to-analog converter (DAC), a mixer, a power amplifier, a linear amplifier, etc.) per antenna. Hence, in order to implement a digital beamforming on a mmW band, there is a problem that the price of a communication device increases. Hence, in case that many antennas are required like the mmW band, the use of the analog or hybrid beamforming scheme is considered. According to the analog beamforming scheme, a plurality of antenna elements are mapped to a single TXRU and a direction of a beam is adjusted by an analog phase shifter. Yet, as the analog beamforming scheme can generate a single beam direction only on the full band, it is disadvantageously incapable of providing a frequency selective BeamForming (BF). The hybrid beamforming scheme has an intermediate form between the digital beamforming scheme and the analog beamforming scheme and includes a scheme of having B TXRUs (where B is smaller than Q) when there are Q antenna elements. According to the hybrid beamforming scheme, although there is a difference according to the connection ways between Q antenna elements and B TXRUs, directions of simultaneously transmittable beams are limited to be equal to or smaller than B.

As described above, since digital BeamForming (BF) performs signal processing on a digital baseband signal to transmit or a received digital baseband signal, a signal can be simultaneously transmitted or received in several direction using multiple beams. On the other hand, since analog BeamForming (BF) performs beamforming in a state that an analog signal to be transmitted or a received analog signal is modulated, a signal cannot be simultaneously transmitted or received in multiple directions exceeding a range covered by a single beam. Normally, a BS performs communication with a multitude of users simultaneously using wideband transmission or multi-antenna characteristics. In case that the BS uses analog or hybrid beamforming and forms an analog beam in a single beam direction, the BS has no choice but to communicate with users included in the same beam direction due to the characteristics of the analog beamforming. RACH resource allocation and resource utilization scheme of a base station according to the present disclosure is proposed by reflecting the restrictions attributed to the analog or hybrid beamforming characteristics.

Figure 7:
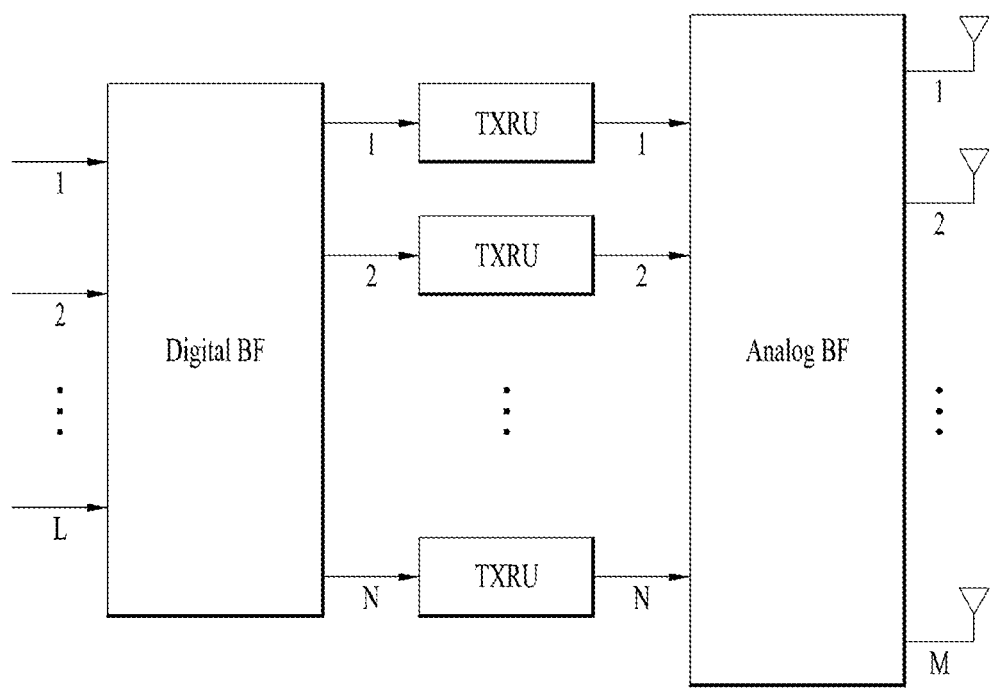
FIG. 7 abstractly shows a hybrid beamforming structure in aspects of Transceiver Unit (TXRU) and physical antenna.

FIG. 7 abstractly shows a hybrid beamforming structure in aspects of Transceiver Unit (TXRU) and physical antenna.

When a multitude of antennas are used, a hybrid beamforming scheme of combining a digital beamforming and an analog beamforming together is on the rise. Here, the analog beamforming (or an RF beamforming) means an operation that an RF unit performs precoding (or combining). In the hybrid beamforming, each of a baseband unit and an RF unit performs a precoding (or combining), whereby performance proximate to the digital beamforming can be advantageously obtained while the number of RF chains and the number of D/A (or A/D) converters are reduced. For clarity, a hybrid beamforming structure may be represented as N TXRUs and M physical antennas. A digital beamforming for L data layers to be transmitted from a transmitting end may be represented as an N-by-L matrix. Thereafter, the N converted digital signals are converted into an analog signal through TXRU and an analog beamforming represented as an M-by-N matrix is then applied thereto.

In FIG. 7, the number of digital beams is L and the number of analog beams is N. In an NR system, a BS is designed to change an analog beamforming in a symbol unit, whereby a direction of supporting an efficient beamforming for a UE located in a specific area is considered. Moreover, when N TXRUs and M RF antennas are defined as a single antenna panel, an NR system considers a scheme of employing a plurality of antenna panels to which independent hybrid beamforming is applicable. Thus, when a BS uses a plurality of analog beams, an analog beam advantageous for signal reception may differ per UE. Hence, regarding a synchronization signal, system information, paging and the like at least, a beam sweeping operation is considered as follows. Namely, a BS changes a plurality of analog beams, which are to be applied in a specific slot or SubFrame (SF), per symbol, whereby all UEs may have opportunity in receiving a signal.

Figure 8:
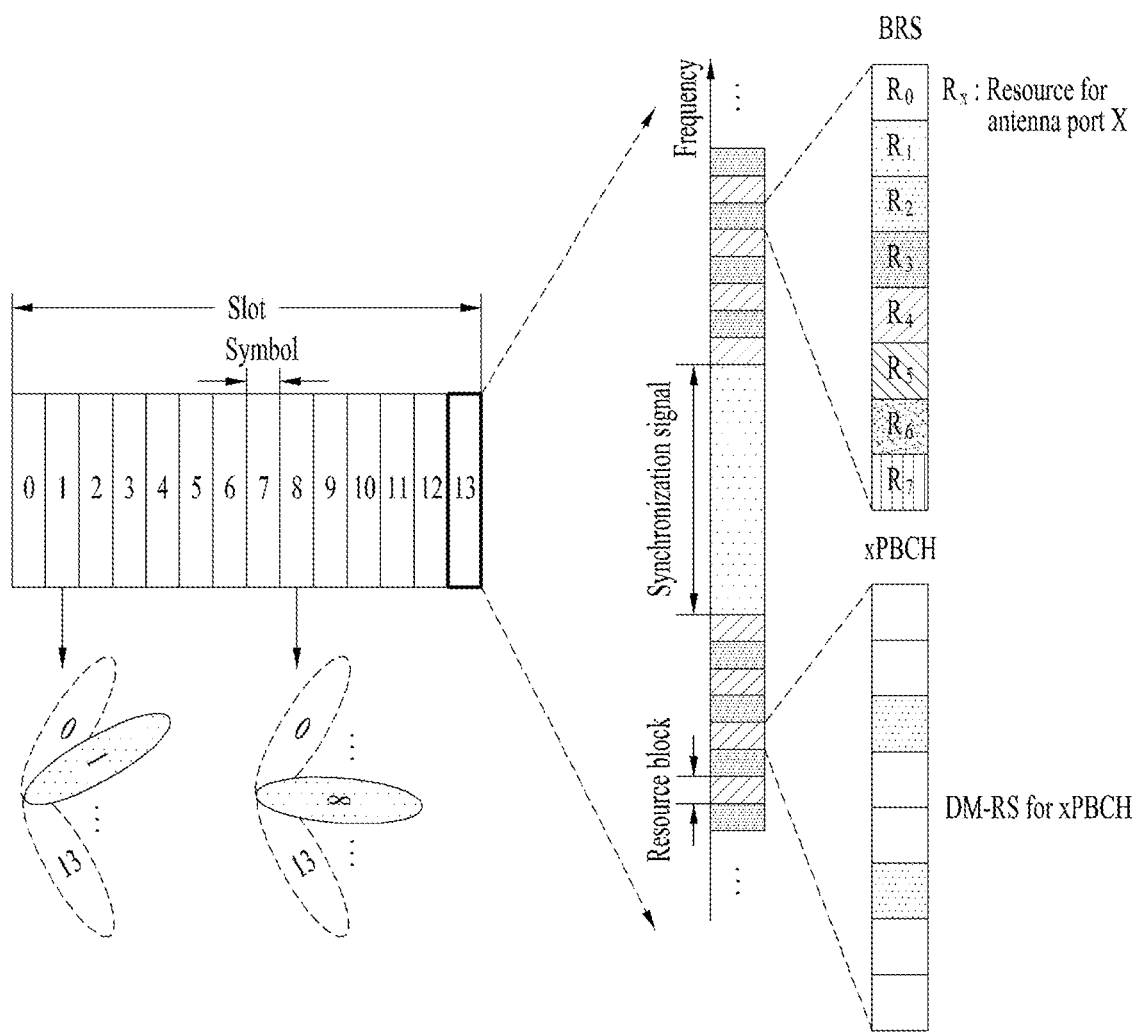
FIG. 8 shows a beam sweeping operation for a synchronization signal and system information in a downlink transmission process.

FIG. 8 diagrammatizes a beam sweeping operation for a synchronization signal and system information in a downlink transmission process.

In FIG. 8, a physical resource or a physical channel, on which system information of the New RAT system is broadcasted, is referred to as Physical Broadcast Channel (xPBCH). In this case, analog beams belonging to different antenna panels in a single symbol may be transmitted simultaneously, and a method of introducing a Beam Reference Signal (BRS), which is a Reference Signal (RS), transmitted for a single analog beam corresponding to a specific antenna panel, as shown in FIG. 8, is under discussion to measure a channel per analog beam. The BRS may be defined for a plurality of antenna ports, and each antenna port of the BRS may correspond to a single analog beam. In this case, unlike the BRS, a synchronization signal or xPBCH may be transmitted for all analog beams included in an analog beam group to be received well by a random UE.

Figure 9:
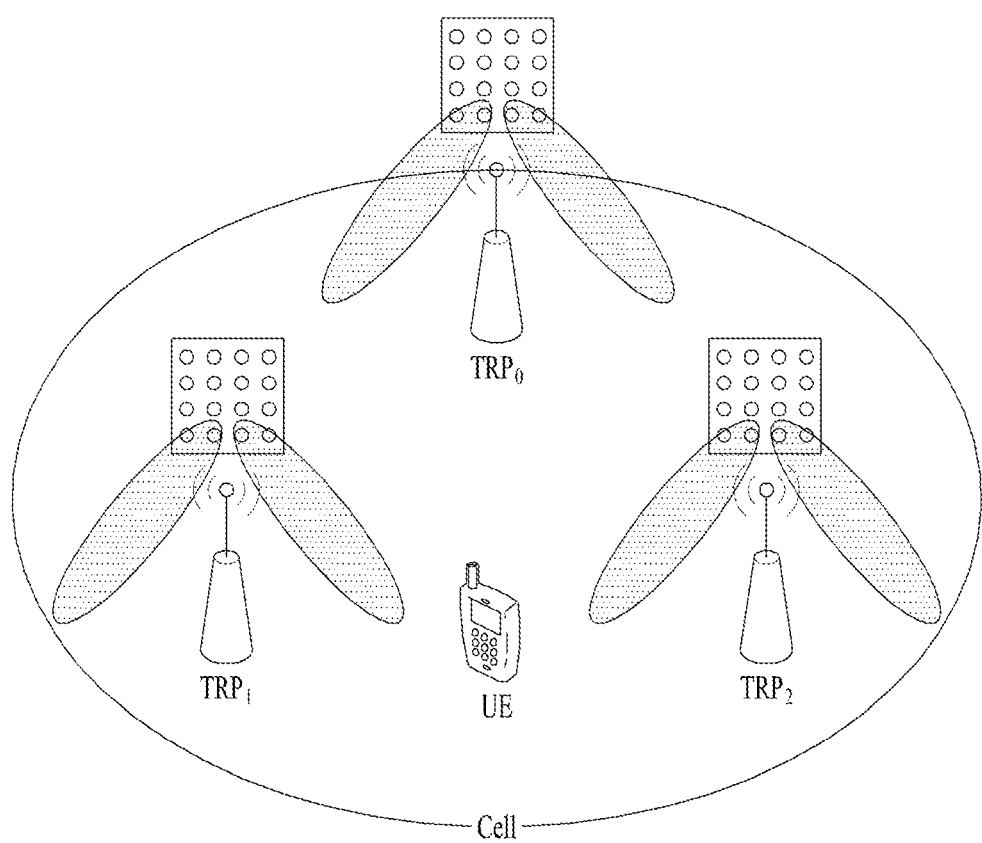
FIG. 9 shows an example of a cell of a New Radio access technology (NR) system.

FIG. 9 shows an example of a cell of a New Radio access technology (NR) system.

Referring to FIG. 9, in a NR system, unlike that one BS forms one cell in a wireless communication system such as the existing LTE or the like, a scheme that a plurality of Transmission Reception Points (TRPs) form one cell is under discussion. If a plurality of TRPs form one cell, although a RTP that services a UE is changed, seamless communication is possible. Hence, mobility management of a UE is advantageously facilitated.

In the LTE/LTE-A system, PSS/SSS is transmitted in omni-directions. Unlike this, in the NR system, a following method is considered. Namely, a gNB applying mmWave performs a beamforming on a signal such as PSS, SSS, PBCH or the like by turning a direction of a beam omni-directionally and then transmits the corresponding signal. In doing so, transceiving a signal by turning a beam direction is referred to as a beam sweeping or a beam scanning. In the present disclosure, 'beam sweeping' indicates an operation of a transmitter side and 'beam scanning' indicates an operation of a receiver side. For example, assuming that a gNB is capable of having maximum N beam directions, the gNB transmits signals of PSS/SSS/PBCH and the like in the N beam directions, respectively. Namely, the gNB transmits synchronization signals of PSS/SSS/PBCH and the like in the respective directions. Or, if the gNB is capable of forming N beams, a plurality of beams can be bundled into a single beam group and PSS/SSS/PBCH may be transceived per beam group. In this case, one beam group includes one or more beams. A signal of PSS/SSS/PBCH or the like transmitted in the same direction may be defined as one SS block and a plurality of SS blocks may exist within a cell. In case that a plurality of SS blocks exist, an SS block index may be used to identify each SS block. For example, when PSS/SSS/PBCH is transmitted in 10 beam directions in a single system, PSS/SSS/PBCH in the same direction may configure one SS block and 10 SS blocks may be understood as existing in the corresponding system. In the present disclosure, a beam index may be interpreted as an SS block index.

The present disclosure relates to a Supplementary UL (SUL) that provides a UL band or carrier on an LTE band supplementarily in addition to an NR UL. Particularly, the SUL is provided to overcome a coverage difference between UL and DL of an NR system in a situation that the NR system and the LTE system coexist. Although the SUL may be provided on the LTE band, it may be provided on the NR band as well in the future. The present disclosure is described on SUL and is applicable to a case that cross carrier scheduling between 2 UL carriers is performed in a situation that the existing carrier aggregation scheme is applied.

In the current 3GPP NR standardization, each of a single DL, a single UL and a single SUL is regarded as a single cell. Although such a cell may not be identified in form of carrier aggregation by a higher layer, it may operate on a physical layer at least in a manner that UL and SUL are separated from each other in cell or carrier unit. And, regarding PUCCH, one of 2 ULs (i.e., SUL and UL) is selected by RRC signaling. While the selected UL is used semi-statically, PUSCH transmission uses the same UL of the PUCCH. In addition, being configured by the RRC signaling is a part of enabling PUSCH to dynamically select one of SUL and UL by DCI. Such configuration is provided to set whether to apply a PUSCH dynamic switching additionally if SUL is configured. This may be determined by the following method. For clarity of the following description, a carrier and a cell are used in the same sense.

UE's capability: UE's capability information signaling is possible to indicate whether a UE can use SUL and UL for transmission simultaneously, whether a switching can be dynamically performed by TDM, or whether a switching by a semi-static scheme is possible. In this case, if UE's capability information relates to whether UL and SUL can be transmitted simultaneously, the UE may be assumed as supporting dynamic TDM. In case of supporting a semi-static PUSCH switching only, switching latency may be reported separately. As a case that SUL and UL are inter-band is defined only in the current NR standard, it is preferable that the SUL and the UL use different RFs, respectively. In this case, it may be provided that a UE capable of supporting SUL is capable of PUSCH dynamic switching.

Network configuration: A network is capable of configuring whether to transmit these two carriers, which may be determined by configuring a CIF. When configuring whether to transmit two carriers through the CIF, a cell index may use a fixed value (e.g., 7, etc.) or is set to an index '+1' of a corresponding UL cell. For the mapping between the CIF and the cell index, a DL carrier and a UL carrier may be usable separately.

A case of a single unpaired carrier is assumed as using a single cell ID. A UL carrier carrying PUCCH is regarded as a carrier paired with a DL carrier. In case that PUCCH does not exist in each of UL and SUL (e.g., SCell), a UL carrier paired with a DL carrier is regarded as a main UL carrier. In case of PCell or a primary cell of a PUCCH group, a main UL carrier or a PUCCH carrier may be assumed as obtaining a UL grant without a CIF. This means that when a PUCCH carrier is changed by RRC signaling, a UL carrier having no CIF is changed, which may cause a problem in a fallback operation.

In order for a fallback operation not to exist, it is assumed that a UL grant is always received without a CIF in UL selected from UL and SUL irrespective of a PUCCH carrier. And, it can be also assumed that a UL grant including a CIF is received in SUL. In doing so, an index for the SUL may be included in the configuration of the CIF so as to prevent collision with the existing CA. Therefore, when a PUCCH carrier is changed, a UL grant of a PUCCH resource may be indicated in a manner that a physical cell index is included in a fallback indication.

In UE's capability reporting, switching latency information of UL/SUL, e.g., information such as 0 us, X us, Y msec and the like may be included. If the corresponding capability corresponds to 0 us, it may mean that capability capable of simultaneous transmission of UL/SUL is guaranteed.

UE's UL/SUL simultaneous transmission capability may be equally treated as UL CA capability or may not. If the UL/SUL simultaneous transmission capability is equal to CA, transmission can be transmitted as many as the sum of maximum values of Transport Block (TB) transmittable on each carrier. On the contrary, if the UL/SUL simultaneous transmission capability is not a maximum value of TB equal to CA, a maximum value of TB processable on the whole UL/SUL may be determined.

In this case, capability of an RF stage and capability of a baseband may be separated from each other. The RF stage reports simultaneous transmission capability by regarding each UL/SUL as a different band combination, and the baseband may report processing capability by regarding UL/SUL as one. Namely, UL CC1-IL CC2, UL CC1-UL CC2/SUL, UL CC1-SUL and the like are separately reported per band combination for an RF, or capability for UL-SUL may be reported and applied to each band combination. The capability of the baseband may include reporting processing capability in case of receiving UL, SUL and UL-SUL respectively or transmitting availability of separate processing.

Similarly, capability of dynamically switching PUCCH may be considered in addition.

In case of PUCCH/PUSCH piggyback or PUCCH as PUSCH is changed dynamically, when a different numerology is applied to each carrier, the following consideration is possible for the processing time between the two parties.

1) When the numerology is the same, processing time capability of UL/SUL is identical. If the processing time capabilities of the two are different from each other, the processing time can be resolved by scheduling. Yet, if there is PUSCH by a UL grant at a timing n+k (k>0) before PUSCH by a UL grant is transmitted at a timing n, the corresponding case is processed as error and a UE may prioritize a front UL grant or a rear UL grant, or select one according to numerology or TTI length or according to other determined rules.

2) Processing time capability of UL/SUL is the same in the combination of the numerologies configurable in the same PUCCH carrier group or the processing time capability of a case of a small subcarrier spacing is greater than the processing time capability of a case of a large subcarrier spacing. If such a case is not satisfied, PUSCH may be scheduled in the course of transmission of PUCCH. In the corresponding case, PUSCH is dropped as fast as possible according to UE capability and UCI is piggybacked on the PUSCH. Optionally, HARQ-ACK/SR may be piggybacked only. Or, an overlapping part may be piggybacked only. This may be possibly only when PUCCH transmission is repeated.

In case that PUSCH and PUCCH select and use the same UL semi-statically, a PUSCH HARQ operation may not have a big problem. Yet, if a UL used by PUSCH is dynamically selected by DCI separately from a UL used by PUCCH, how DCI will select SUL or UL becomes problematic.

A first thinkable solution is CIF that used to be used by CA. As 2 ULs are provided basically, CIF may be used in a manner of regarding them as different carriers. Yet, this may not match in a sense that SUL and UL are regarded as a single cell. Although SUL and UL are basically used together, since one cell can be carrier-aggregated with another cell, CIF may collide with CA in operation.

A second thinkable solution is to provide a 1-bit field indicating one of SUL and UL separately. This may be the most basically accessible solution but has penalty that a single field is further added in DCI.

A third thinkable solution is to use a BandWidth Part (BWP). Currently, maximum N (e.g., maximum 4 in the current Rel.15) BWPs may be configured per carrier. And, some BWPs selected from them are dynamically activated with DCI. Since SUL and UL are considered as a single cell currently, it is natural that maximum N BWPs are configured basically. Yet, from the perspective of configuring maximum N BWPs per carrier, it may be preferable that each of the SUL and the UL configures maximum N BWPs. Yet, in case that a DCI field in a single cell operation indicates BWP(s) to be activated among maximum N BWPs, a size of a DCI field may be come $\log_2 N$. In order for the DCI field to indicate BWP that activates both of the SUL and the UL, $2^*\log_2 N$ bits are required. Yet, in order to implement it in the same field size, it is proposed to use $\log_2 N$ bits only. In this case, N BWPs need to be configured throughout SUL and UL, and one of the BWPs should be indicated using $\log_2 N$ bits.

Assuming that maximum N bits are configured in the existing UL, in case of a SUL configured UE, it is provided that maximum N BWPs will be configured throughout SUL and UL. In this case, it may be provided that at least 1 BWP is configured in the SUL or the UL. OR, in case of the SUL, it may be restricted that maximum 1 BWP is configured only. Moreover, PUSCH dynamic switching is implemented using an activated field of BWP in a UL grant.

Meanwhile, in the current NR standardization, it is specified that SUL CIF is sued for fallback DCI. Yet, fallback transmission becomes ambiguous with transmission on a UL carrier selected from SUL and UL only. If a value of SUL CIF of UL fallback DCI indicates not UL but SUL from the perspective of a UE, how to interpret it becomes ambiguous. Therefore, the following methods may be considered.

A. Transmit all on UL carrier irrespective of SUL CIF value

B. Select UL or SUL carrier according to SUL CIF value only

C. Select UL or SUL carrier according to SUL CIF value only if dynamic PUSCH switching is configured. Transmit on UL carrier irrespective of SUL CIF value if dynamic PUSCH switching is not configured.

Particularly, UL/SUL CIF in fallback DCI may be assumed as present only if dynamic PUSCH switching is configured. When a size of a UL grant is large in comparison to DL scheduling DCI, i.e., in case of fallback DCI, CIF may be assumed as not present irrespective of presence or non-presence of dynamic switching. A size of a UL grant of fallback DCI is assumed as set with reference to non-SUL carrier irrespective of presence or non-presence of CIF.

Namely, regarding a UL grant DCI field of fallback DCI, resource allocation, time domain information and the like are determined according to an active UL BWP (or a configured UL BWP) of a corresponding non-SUL with reference to a non-SUL carrier. In this case, if a bandwidth of SUL is greater than that of non-SUL, an RA field may be insufficient for SUL scheduling. In this case, it may be assumed that only a BW (e.g., starting with PRB of a lowest index) corresponding to an allowed RA field size is scheduled through fallback DCI. Otherwise, it may be assumed that it is not used in a manner of being padded with padding bits such as 0. This is to enable a DCI size to be unchangeable irrespective of UL/SUL. Or, in order to match a size with DCI for normal data scheduling, a fallback DCI size may be determined without considering SUL. In this case, both of UL and SUL may be restrictions on resource allocation due to the corresponding DCI size.

For clarity of the following description, DCI size is defined as follows.

DCI format 1_0 (DL fallback DCI): m1-bit size
DCI format 0_0 (UL fallback DCI) for UL: m2-bit size
DCI format 0_0 (UL fallback DCI) for SUL: m3-bit size
DCI format 1_1 (DL non-fallback DCI): m4-bit size
DCI format 0_1 (UL non-fallback DCI) for UL: m5-bit size
DCI format 0_1 (UL non-fallback DCI) for SUL: m6-bit size Fourthly, in the current 3GPP NR, in order to reduce the blind decoding number, DL fallback DCI and UL fallback size are configured to have the same size, which is under discussion. And, DL non-fallback DCI, i.e., DL normal DCI and UL normal DCI are configured to have the same size, which is also under discussion. If padding bits are added to UL fallback DCI in order to equalize the sizes of DL fallback DCI and UL fallback DCI, one of the padding bits may be used as SUL CIF.

In order to match a size of UL fallback DCI to that of DL fallback DCI, the following may be considered.

First of all, consider a case that a size of UL fallback DCI and DL fallback DCI is max(m1, m2). In this case, if m1 is equal to or smaller than m2, as there is no more field in the UL fallback DCI, SUL CIF is assumed as not existing. In case of the DL fallback DCI, a size can be matched by padding. Since there is no SUL CIF in the UL fallback DCI, SUL fallback DCI is also assumed as not existing. In case of the SUL fallback DCI, if a size is smaller than max(m1, m2), max(m1, m2) is reached by padding the SUL fallback DCI. If a size of the SUL fallback DCI is greater than max(m1, m2), a portion of a field of the SUL fallback DCI is truncated with MSB or LSB. For example, a field for resource allocation of a frequency domain can be truncated with MSB or LSB. If m1 is greater than m2, SUL CIF may be added to UL fallback DCI. Since the SUL CIF is added to the UL fallback DCI, the SUL fallback DCI is assumed as having SUL CIF. If a size of the SUL fallback DCI having the SUL CIF added thereto is greater than max(m1, m2), a portion of the field of the SUL fallback DCI is truncated with MSB or LSB. For example, a field for resource allocation of a frequency domain may be truncated with MSB or LSB.

Subsequently, first of all, consider a case that UL fallback DCI and DL fallback DCI are m1. In this case, only if m2 is smaller than m1 and m3 is smaller than m1, SUL CIF can be added. In this case, when m2 and m3 are different from each other, positions of the SUL CIF may be different from each other. This is described with reference to the accompanying drawings.

FIG. 10 and FIG. 11 show examples of adding SUL CIF to a fallback DCI according to an embodiment of the present disclosure.

Referring to FIG. 10, when m2 and m3 are different values, it may be observed that positions of SUL CIF may be different from each other. To avoid this, SUL CIF may be configured as FIG. 11 so as to be located far behind the padding for matching a DCI size. Particularly, the configuration of FIG. 11 is advantageous in that it is possible to check that DCI is provided for which one of UL, SUL and DL in advance before the decoding of the corresponding DCI.

Assuming that there is no SUL CIF if any one of m2 and m3 is equal to or greater than m1, some field of UL/SUL fallback DCI having a size greater than m1 is truncated with MSB or LSB. For example, a field for resource allocation of a frequency domain can be truncated with MSB or LSB. After the truncation, SUL CIF is set to be located at a last DCI bit.

Although the case of the fallback DCI is exampled in the above description, it is a matter of course that CIF can be configured in the same manner in case of normal DCI as well.

In some implementations, SUL and UL may have different numerologies. For example, the SUL may use a 15 KHz subcarrier spacing by being allocated on LTE band and the UL may use a 30 KHz subcarrier spacing to show more beam-specific SSBs at the same time. Thus, in case of using different numerologies, if PUSCH switches dynamically, a BS gives an indication of timings of initial transmission and retransmission of PUSCH through DCI.

When the BS gives the indication of the timings of the initial transmission and the retransmission through the DCI, if a transmitted carrier is changed, a problem of timing interpretation may be caused. To solve this problem, according to the current NR, a timing is interpreted in a manner of working to the numerology of a scheduled link. And, regarding a start point of the timing, a TTI of UL overlapping temporarily with a control region of DL is interpreted as a first start point. To avoid such a complicated problem, when SUL and UL use PUSCH dynamic switching, it may be provided that initial transmission and retransmission are performed on the same carrier until the end of one HARQ process in UL HARQ.

Generally, a maximum value of HARQ process ID is determined by considering Round Trip Time (RTT). For example, in case of LTE FDD, 8 HARQ process IDs are provided by considering that 8 transmissions may occur sequentially in RTT with 8 TTIs. In case of SUL and UL, it is basically provided as a single cell. And, since DL is transmitted on a single carrier, one HARQ process ID is preferably shared. Moreover, regarding UL HARQ process ID, as PUSCH cannot be simultaneously transmitted in SUL and UL, the same HARQ process ID is preferably shared.

When HARQ process ID is shared, a maximum value of this value should be determined in consideration of RTT. In case of determining a maximum value of DL HARQ process ID, as there is a single DL, there is no problem. Yet, in case of determining a maximum value of UL HARQ process ID, as UL and SUL may have different numerologies, respectively, it may cause an ambiguous problem. Therefore, the present disclosure proposes the following. First of all, when SUL and UL are operated, UL HARQ process ID is shared between SUL and UL. And, a maximum value of HARQ process ID is set to have the same value as RTT of a UL carrier having TTI in short length.

In NR, it is possible to configure the HARQ process number per carrier. In case that SUL and UL share HARQ, it means that one HARQ process number is set for two carriers. This may be a value determined by a network in consideration of soft buffer and processing capability. Moreover, it is able to configure whether HARQ will be supported by cross carrier. Or, such a value may be configured different depending on capability of a UE. In case that such HARQ is shared, the processing for a processing time and maximum TBS may follow the restriction or numerology of each scheduled carrier. Therefore, Resource Block Granularity (RBG) and the like of resource allocation determined by a timing may vary depending on a schedule for which carrier. This means that a DCI size may vary according to a CIF value. In addition, a waveform may vary as well. As a waveform is configured per carrier UE-specifically, it may vary according to a CIF value. In this case, it may be difficult to match TBS identically for both of initial transmission and retransmission. Hence, it is able to dynamically indicate a scaling factor for matching TBS identically by being limited to such a case. Of course, this is generally applicable to a case that HARQ is shared with multiple carriers.

Configuration for overhead that determines a reference RE may be set to the same value for two carriers in consideration of such a situation. Or, a single parameter may be assumed as applied to both UL and SUL. This is similarly applicable to a case that initial transmission and retransmission are transmitted on different BWPs. Namely, a reference RE overhead may be configured per carrier for each BWP or set to one value between BWPs shared for initial transmission and retransmission. Similarly, a waveform may be configured per BWP. Or, it may be solved through scheduling by a network after the configuration per carrier for each BWP. Yet, a UE may make the following assumption. When a UE needs to calculate TBS again, it assumes that TBS of initial transmission is equal to that of retransmission.

A fallback UL grant may assume that it is a UL grant for a UL carrier scheduled without CIF or a UL grant for a UL carrier unconditionally identical to PUCCH, or configure what kind of carrier is used for a fallback UL grant as a default by a higher layer. Or, a carrier having carried Msg3 may be used as a fallback carrier. This is identically applicable to a waveform used for a fallback UL grant. When the Msg3 carrying carrier is changed, it may be assumed that a PUCCH carrier is automatically changed. When an RACH procedure is successful (e.g., on a successful reception of Msg 4), a UE may assume that PUCCH carrier reconfiguration is implicitly performed. In addition, assume that Msg 3 and Msg 4 HARQ-ACK transmission in an RACH procedure are performed on an RACH triggered carrier. Hence, in this case, a PUCCH carrier can be processed as follows:

- Assume PUCCH carrier reconfiguration upon RACH transmission triggering
- Assume PUCCH carrier reconfiguration after Msg 3 transmission.
- Assume PUCCH carrier reconfiguration after receiving Msg 4.
- Change a PUCCH carrier dynamically for HARQ-ACK transmission only after receiving Msg 4. Moreover, PUCCH transmission on an original PUCCH carrier may be stopped or dropped for a corresponding time or regarded as PUCCH carrier reconfiguration.
- Transmit HARQ-ACK for Msg 4 on an original PUCCH carrier until PUCCH reconfiguration occurs. This means that a default resource is configured for each PUCCH carrier and that HARQ-ACK for Msg 4 is transmitted using the corresponding default resource.

In the current LTE, one of several PUCCH resources is specified in DCI through ACK/NACK Resource Indicator (ARI) and a UE transmits ACK/NACK on the specified resource. In case of operating UL and SUL, as there are 2 carriers, it may be difficult to share ARI with the carriers. For example, after PUCCH resources have been configured by RRC, assuming that a specific PUCCH resource among the resources is designated through ARI, if the same numerology is used between SUL and UL, the ARI can be shared. Yet, in case of a different numerology, as a PUCCH resource may be configured differently, it may cause a problem in sharing ARI. Therefore, according to the present disclosure, when SUL and UL are operated together, PUCCH resources are separately configured between SUL and UL only if three are different numerologies. In case of the same numerology, PUCCH resources are configured without discrimination.

Moreover, in the current NR, grant-free PUSCH is under discussion. This is the scheme for a UE to transmit PUSCH on a predetermined resource without a UL grant to reduce latency. According to this scheme, a base station gives a UE the configuration of resources to use as grant-free PUSCH. If there is a packet, one of the resources is used. In case of using SUL and UL dynamically through PUSCH switching, transmission may occur at the same timing of grant-free PUSCH transmission. Since the current RAN2 assumes that PUSCH is not transmitted at the same timing, if PUSCH and grant-free PUSCH are transmitted in SUL (or, transmitted in UL or transmitted in SUL and UL, respectively), it may be provided that one of them should be dropped.

Namely, since the grant-free PUSCH has the latency issue, it may be provided that scheduled PUSCH should be dropped. Or, since SUL has a wide coverage, only SUL transmission may be allowed. Or, transmission having a large TBS or a lower coding rate may be allowed only. Or, since reliability will be good if MCS is low, MCS may be set to perform lower transmission only. Or, a priority between grant-free PUSCH and general grant-based PUSCH is indicated by resource configuration of the grant-free PUSCH.

When resources of grant-free PUSCH are configured between SUL and UL, they may be configured for two carriers all. Particularly, in case of dynamic PUSCH switching, a BS may specify that scheduled PUSCH will be transmitted on which carrier through DCI. Yet, as there is no such indication in case of grant free, it may be ambiguous that grant-free PUSCH will be transmitted on which carrier. Therefore, the present disclosure proposes the following.

1. Resource configuration of grant-free PUSCH may be configured for SUL and UL both. This may be provided to be enabled only if dynamic PUSCH switching is configured.

2. When resource configuration of grant-free PUSCH is configured for SUL and UL both, if a resource of the grant-free PUSCH overlaps between SUL and UL in a time domain (or, if an overlapping interval in a time domain is equal to or greater than a threshold), a UE may select whether to make a transmission in SUL or UL according to an RSRP threshold of RSRP of DL related to UL. The threshold in the time domain and the RSRP threshold can be indicated by a BS through RRC signaling. Or, when resources of grant-free PUSCH of SUL and UL overlap with each other, a BS may configure whether to make a transmission on which carrier by RRC. This may be provided to be enabled only if dynamic PUSCH switching is configured.

3. UL/SUL is considered as a single cell according to the grant-free resource configuration. If resource configuration is possible separately, an RNTI value may be differentiated per cell at least. This means that a UL grant transmitted on one DL carrier can be identified with a CIF value or an RNTI value. Yet, assuming that UL retransmission may be performed on a grant-free PUSCH occurring cell or another cell, it should have the same operation having several resources existing in a single cell. If so, a resource is identified by identifying an RNTI value and the like or HARQ ID and the like should be used differently.

4. In case that a grant free can be transmitted in SUL, the validity of grant-free PUSCH may follow the following definitions. A resource assumed as SUL to UL semi-statically may be received, a resource not assumed as UL may be received, or UL/flexible may be received. Since there is no DL in case of SUL, flexible/UL may be received only in semi-static DL/UL configuration. In this case, a flexible resource may be processed as follows.

Whether grant-free PUSCH is always valid on a flexible resource is configured by a higher layer.

Whether grant-free PUSCH is valid on a flexible resource follows SFI/group-common PDCCH if group-common PDCCH is configured for SUL. Otherwise, it is assumed as valid according to the grant-free PUSCH configuration.

Assuming that grant-free PUSCH is valid in flexible and UL, an unusable resource is rate-matched or configured as a reserved resource.

In some implementations, when a resource of grant-free PUSCH is configured for SUL and UL both, if the resource overlaps between SUL and UL in a time domain (or, if an overlapping region is equal to or greater than a threshold), a carrier to carry grant-free PUSCH is selected according to the following rules.

As the coverage is wide in SUL, grant-free PUSCH may be allowed to be transmitted in SUL.

Transmission may be allowed to be made on a carrier having resource configuration of grant-free PUSCH having a large TBS or a lower coding rate.

Since reliability will be good if MCS is low, transmission may be allowed to be made on a carrier having resource configuration of grant-free PUSCH having a lower MCS.

A priority of grant-free PUSCH transmission is indicated in the grant-free resource configuration.

In the situation of the current SUL, PUSCH and PUCCH can be simultaneously transmitted in SUL and UL, respectively. In this case, if PUSCH and PUCCH are simultaneously transmitted, power given to each transmission may be lowered due to the PAPR problem. Hence, an operation of sending PUCCH in a manner of piggybacking it on a carrier that carries PUSCH may be considered. Yet, the piggyback may become complicated if there are different numerologies between SUL and UL.

In case that SUL and UL use the same numerology, it is possible to consider piggybacking PUCCH on PUSCH in a single carrier. Yet, in case of different numerologies, if PUCCH is piggybacked on PUSCH, latency may be changed. For example, if PUCCH using 14 symbols of 15 KHz is piggybacked on PUSCH transmission using 14 symbols of 30 KHz, latency of PUCCH transmission may be reduced possibly. In this case, as the latency is shortened, it may not be a big problem. Yet, in case of piggybacking PUCCH using 14 symbols of 30 KHz on PUSCH transmission using 14 symbols of 15 KHz, latency of PUCCH transmission is increased in comparison to that before the piggyback.

To solve this problem, when PUCCH transmission having a greater subcarrier spacing is piggybacked on PUSCH transmission having a smaller subcarrier spacing, it is necessary to piggyback PUCCH on PUSCH only before a timing that ends before piggybacking the PUCCH transmission. Moreover, as the PUCCH transmission is the timing that considers a processing time as well, PUCCH needs to be piggybacked on PUSCH only after a timing that starts before piggybacking the PUCCH transmission. Or, when PUSCH and PUCCH are transmitted in UL and SUL, respectively, it may be provided that the PUSCH is dropped. This is because the PUSCH transmission is less important than the PUCCH transmission in general.

In case that SUL and UL have different numerologies, respectively, PUSCH and PUCCH are scheduled on different carriers, respectively. If they overlap with each other in a time domain entirely or in part, it is necessary to consider dropping of one channel to prevent simultaneous transmission.

Considering the importance of a channel itself, the importance may be given in order of A/N PUCCH, UCI PUSCH, CSI PUCCH, and PUSCH. UCI PUSCH refers to PUSCH for a BS to give a UCI grant, and PUSCH refers to other PUSCH.

In case that PUSCH and PUCCH overlap with each other in a time domain entirely or in part, channels are dropped by starting with a non-important channel in the above importance order. In doing so, the whole channel may be dropped or the overlapping region may be dropped. In case of dropping the overlapping region only, rules may be determined. For example, if an overlapping portion is equal to or smaller than X symbols, only the overlapping region may be dropped. Namely, when a lot of resources are dropped, although the rest portion is transmitted, decoding may become impossible. Thus, it is unnecessary to send it. According to this rule, only an overlapping region may be dropped if a ratio of a resource to transmit to an overlapping resource is equal to or smaller than Y depending on a coding rate.

In case that SUL and UL have different numerologies, respectively, PUSCH and PUCCH are scheduled on different carriers, respectively. If they overlap with each other in a time domain entirely or in part, a rule of piggybacking PUCCH on PUSCH is required to prevent simultaneous transmission.

First of all, an overlapping region is piggybacked only and the rest may be transmitted without piggyback, or the whole part may be piggybacked. Therefore, according to the above PUSCH and PUCCH dropping rule, if PUCCH is dropped, it may be provided to be piggybacked. Regarding the piggyback, reliability of A/N of high importance can be increased by piggybacking A/N PUCCH only. Such a piggyback rule is very dependent on a processing time. For example, when it is intended to piggyback PUCCH on PUSCH, if PUCCH can be processed together before starting the processing for PUSCH transmission, the piggyback is possible. Yet, if PUCCH is available only when PUSCH is being processed, the piggyback may be impossible.

First of all, in the current NR system, a processing time taken to be ready for ACK/NACK after decoding PDSCH (i.e., a time taken to be ready for ACK/NACK after PDSCH) is defined as N1, and a processing time taken to be ready for PUSCH after decoding PDCCH (i.e., a time taken to be ready for PUSCH after a last symbol of a PDCCH region having PDCCH transmitted thereon) is defined as N2.

Based on such definitions, the first is a case of piggybacking PUCCH after puncturing PUSCH and the second is a case of piggybacking PUCCH by rate-matching PUSCH, which are separately described as follows.

Firstly, in case of puncturing, since a PUSCH processing can start before a PUCCH processing ends and PUCCH just needs to be inserted in the middle of PUSCH transmission, if the PUCCH processing ends in the course of transmitting PUSCH, PUCCH can be piggybacked on PUSCH. Therefore, only after a time N1 right after transmitting PDSCH (or, a maximum value of N1 and N2 in consideration of a parallel processing), it may be provided that PUCCH is transmitted by being piggybacked in the course of PUSCH transmission. Although all PUCCH transmissions may be piggybacked, a region overlapping with PUSCH is piggybacked only and the rest may be transmitted at an originally transmitted timing.

Yet, in such a case, one PUCCH transmission may be transmitted in a manner of being temporarily separated, whereby UE complexity may increase. To prevent this, it may be provided that PUCCH is transmitted in a manner of being piggybacked in the course of PUSCH transmission only after PUCCH scheduled time. In this case, although all PUCCH transmissions may be piggybacked, a region overlapping with PUSCH is piggybacked only and the rest may be transmitted at an originally transmitted timing.

Secondly, in case of the rate matching, PUSCH processing is unable to start before PUCCH processing ends. Hence, for the piggyback, it is unable to consider a PUSCH processing time only. For example, when PUSCH is transmitted after a time N2 after a last symbol of a PDCCH region on which PDCCH was transmitted, although PUCCH processing has ended at this moment, the PUSCH requires an additional time N1 for processing UCI-piggybacked PUSCH in consideration of PUCCH to transmit together. Hence, only if the following situation is satisfied all, it may be provided that PUSCH is transmitted after the time N1 since the transmission of PDSCH. And, only if PUSCH is transmitted after a time (N1+N2) (or, a maximum value of N1 and N2 in consideration of a parallel processing) after a last symbol of a PDCCH region on which a UCI grant was transmitted, it may be provided to be piggybacked. Thus, although all PUCCH transmissions may be piggybacked, a region overlapping with PUSCH is piggybacked only and the rest may be transmitted at an originally transmitted timing.

Or, it may be provided as follows. First of all, PUSCH is transmitted after a time N1 since the transmission of PDSCH. Only if PUSCH is transmitted after a time N1+N2) (or, a maximum value of N1 and N2 in consideration of a parallel processing) after a last symbol of a PDCCH region on which a UCI grant was transmitted, it may be provided that PUCCH is transmitted in a manner of being piggybacked in the course of PUSCH transmission only after a PUCCH scheduled time. Thus, although all PUCCH transmissions may be piggybacked, a region overlapping with PUSCH is piggybacked only and the rest may be transmitted at an originally transmitted timing.

The above-mentioned N1 and N2 are piggyback-considered processing times and are applicable in a manner of being newly defined as (N1+d1) and (N2+d2).

Meanwhile, in the above description, if a UL grant is transmitted through fallback DCI in SUL on RRC configuration/deconfiguration/reconfiguration, regarding that PUSCH is transmitted on which carrier, a case of transmitting it on a configured PUCCH carrier, a case of transmitting it in SUL, and a case of transmitting it in UL are described.

In case of transmitting PUSCH on a configured PUCCH, there may be ambiguity in reconfiguring a PUCCH carrier. This is because it is unable to know what kind of carrier is meant by the fallback DCI. To resolve this, when PUCCH carrier configuration/reconfiguration is performed, UL transmission by a UL grant of fallback DCI may be allowed on a SUL (or UL) carrier.

Next, in case of transmitting PUSCH in SUL, ambiguity may be generated when the SUL is deconfigured. This is because SUL is actually deconfigured despite that fallback DCI means transmission in SUL. To resolve this, upon SUL deconfiguration, UL transmission by a UL grant of fallback DCI may be allowed on a UL carrier.

In case that PUSCH is transmitted in UL, assume a case that a PUSCH transmission time for the reception of a UL grant by RRC signaling before fallback to UL is a time before a fallback timing. If transmission resources are allocated to DL entirely or in part because a UL grant means the transmission in SUL before fallback, transmission is made not in UL but in SUL. This may be regarded as a BS intentionally attempts the transmission in SUL. Yet, when a UL grant is originally provided for UL instead of SUL, as DCI for UL and DCI for SUL are different from each other, it may be ambiguous how to make transmission on which resource of SUL, whereby dropping may be performed. Or, despite receiving UL DCI, it may be able to predefine how to interpret and transmit UL DCI for SUL transmission in preparation for transmission in SUL.

In some implementations, in SUL, SUL and UL may use different numerologies. And, SUL may use currently use a subcarrier spacing smaller than that of DL/UL. For example, 15 KHz SCS and 30 KHz SCS are available for SUL and DL/UL, respectively. In this case, a length of a slot of SUL becomes two times greater than that of a DL/UL slot, and (if synchronization matches) one SUL slot matches 2 DL/UL slots in a time domain. In such a case, if PUSCH dynamic switching is configured, DCI in DL may indicate whether PUSCH will be transmitted in UL or SUL using 1 bit. In this case, as UL and SUL differ from each other in a length of a bandwidth, sizes of various DCI fields (e.g., resource allocation field, etc.) are changed, whereby a size of the whole DCI may differ between UL and SUL. Thus, if a size of DCI is different, a UE should perform blind decoding on 2 DCIs in a search space. To resolve this, DCI sizes may be forced to match each other between UL and SUL. Namely, the lengths are matched by padding a short-length side. If so, the number of blind decoding can be decreased.

Yet, if SCSs of SUL and UL are different from each other, the UL (or SUL) having a smaller SCS matches 1 UL (or SUL) in N DL slots in comparison to DL. Here, N means an SCS N times greater than a smaller SCS. For this case, it is unnecessary to schedule N DL slots for UL (or SUL) having a smaller SCS. Hence, it may be provided that scheduling is performed on DL slots less than the N DLS slots only. For example, scheduling may be performed on n (=kN) slots, where k=0, 1, 2, 3, 4 . . . .

Thus, in case of scheduling transmission of UL (or SUL) having a small SCS in a specific DL slot only, all DCIs on transmissions in UL and SUL should be blind-decoded in the specific DL slot. Yet, only DCI on transmission of UL (or SUL) having a greater SCS may be blind-decoded in other DL slots. Therefore, according to the proposal of the present disclosure, sizes of DCIs for scheduling of UL and SUL are configured identically by padding in a specific DL slot for transmitting DCI on transmission of UL (or SUL) having a small SCS, and transmission is performed in other slots without padding, i.e., not matching the DCI size. Such a specific DL slot may be indicated by RRC signaling (or MAC CE) or predefined through transmission and reception.

In the current 3GPP NR, as UL BWP is changed despite that DK BWP is not changed, if UL BWP at a DL grant timing of PDSCH is different from UL BWP at a timing of transmitting A/N, it is provided that the A/N will not be transmitted. Namely, although a switching time is necessary because of the changed BWP, it is unclear whether an operation of transmitting A/N is secured in consideration of such a switching time.

Yet, in case of configuring SUL, ambiguity may rise. When A/N is transmitted in SUL, if BWP of SUL is changed, it is preferable that the A/N is not transmitted. Yet, if BWP of UL is changed, since it has nothing to do with BWP of SUL, it is preferable that A/N is transmitted. This also applies to a case of transmitting A/N in UL.

On the other hand, in case of transmitting A/N in SUL, although BWP of SUL is changed, as PUSCH is transmitted at an A/N timing in UL, if PUSCH is transmitted by UCI piggybacking, it is preferable that A/N transmission is possible in UL. Likewise, in case of transmitting A/N in UL, although BWP of UL is changed, as PUSCH is transmitted at an A/N timing in SUL, if PUSCH is transmitted by UCI piggybacking, it is preferable that A/N transmission is possible in SUL.

Yet, if BWP of a carrier carrying A/N is changed, although A/N is transmitted on another carrier by piggyback, it is preferable not to transmit the A/N. Yet, in the above case, as the A/N is not transmitted even in a situation that the A/N can be transmitted, it causes a problem of degrading actual operation performance. Particularly, HARQ-ACK resource indicated by DCI at a PDSCH transmitted timing may be assumed as HARQ-ACK resource in one UL BWP activated at a corresponding timing or the PDSCH transmitted timing. If UL BWP that carries PUCCH is changed from the timing to a timing at which PUCCH is transmitted actually, a previous HARQ-ACK resource may not be valid any more. Thus, in other situations, HARQ ACK or UCI transmission may be expected.

According to such assumption, if UL BWP for transmitting PUCCH is changed in case of PUCCH transmission only, it means that HARQ ACK is dropped. Besides, in case that PUSCH piggyback or UL BWP corresponding to PUCCH is not changed, HARQ ACK transmission is expected. Moreover, latency required for BWP switching is regarded as a gap, and DL transmission and UL transmission scheduled in the gap may be dropped.

In some implementations, if DL and SUL that is not UL are interpreted as a paired spectrum, a case of transmitting A/N in SUL is considered. In this case, although BWP of SUL is changed, as PUSCH is transmitted in UL at an A/N timing, if PUSCH is transmitted by UCI piggyback, it is proposed to enable A/N transmission in UL. Moreover, although BWP of SUL is changed, when A/N is transmitted in UL, as a PUSCH timing of SUL is equal to an A/N transmission timing, if the A/N piggybacked PUSCH is transmitted in SUL in a manner of being piggybacked, it is allowed to transmit A/N as well.

Additionally, in the current 3GPP, the offset of Timing Advance (TA) is defined. This is described with reference to the accompanying drawing.

Figure 12:
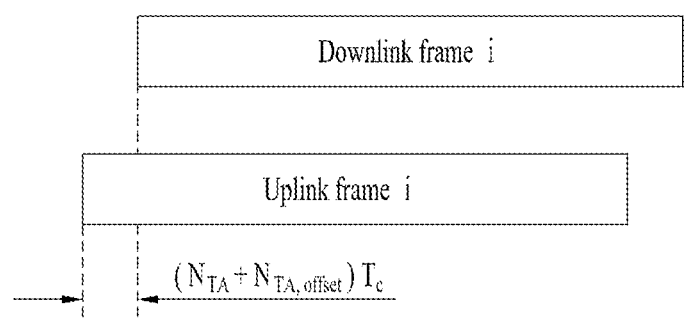
FIG. 12 shows a timing between an uplink frame and a downlink frame defined in 3GPP.

FIG. 12 shows a timing between an uplink frame and a downlink frame defined in 3GPP. Referring to FIG. 12, TA is defined as the sum of a value of $N_{TA}$ and a value of $N_{TA,offset}$.

The value of $N_{TA,offset}$ is defined per frequency band. Generally, on TDD band, this value is used for a retuning time of UL and DL of RF of a BS. On FDD band, this value is set to 0 because RF is used without a retuning time in a manner of being divided for UL and DL.

In the current NR, the $N_{TA,offset}$ value shown in Table 4 is defined for each band.

TABLE 4

| Duplex Mode of cell used for uplink transmission | $N_{TA\ offset}$ |
|---|---|
| FDD in FR1 or FR2 | 0 (Note) |
| TDD in FR1 without LTE-NR coexistence | 25560 (correspond to 13 μs) |
| TDD in FR2 | 13763 (correspond to 7 μs) |

(Note):
Regardless of whether LTE-NR coexistence is configured or not in FR1

Yet, when NR UL is TDD and LTE band is FDD, if the LTE band is used as SUL of NR, how to define $N_{TA,offset}$ of SUL becomes a problem. In case of using $N_{TA,\ offset}$ of UL of NR for SUL, a timing is aligned with that of UL of NR but fails to be aligned with a timing of another LTE signal on the LTE band. In case of using $N_{TA,offset}$ of the LTE band for SUL, although a timing is aligned with that of another LTE signal on the LTE band but a problem of failing to be aligned with a timing of UL of NR is caused.

The timing alignment between UL and SUL of NR may not be a significant problem because of different bands in between. For example, when a switching is strictly performed between UL and SUL from the perspective of a single UE, as the timing between UL and SUL is not aligned in a switching interval, a resource amounting to one OFDM symbol may not be usable. Yet, in case of switching UL and SUL semi-statically, as the number of such switching is relatively small, the number of the lost symbols is very small. From this perspective, a value of $N_{TA,offset}$ of SUL is preferably used as a value of $N_{TA,offset}$ of LTE band. However, in case of performing a dynamic switching between UL and SUL, as the switching number is high, the timing alignment is required. From this perspective, it is preferable that a BS configure whether a value of $N_{TA,offset}$ follows that of UL or SUL with respect to SUL.

As described above, in the current SUL and UL, PUSCH and PUCCH cannot be simultaneously transmitted on their own carriers, respectively. Yet, SRS and other signals (SRS, PUSCH, PUCCH, RACH, etc.) can be simultaneously transmitted on their own carriers, respectively. For example, when SRS is transmitted in SUL, PUSCH can be simultaneously transmitted in UL. When SRS is transmitted in SUL, SRS can be transmitted in UL.

In such a case, when simultaneous transmission is configured or schedule, a situation of power limit may occur. This is because a sum of powers of simultaneously transmitted signals cannot exceed $P_{c,max}$. Hence, if the configured or scheduled power, i.e., the sum of the powers of the simultaneously transmitted signals exceeds $P_{c,max}$, there is a problem that the power of the signals should be reduced. To solve this problem, the following methods are proposed.

Firstly, when in SUL and UL, SRS is transmitted on one carrier and one or more signals of SRS, PUSCH, PUCCH and RACH are transmitted on the other carrier simultaneously, if a sum of powers of simultaneously transmitted signals exceeds $P_{c,max}$, there is a method of decreasing the powers of the signals linearly at the same ratio. This method assumes that there is no priority between two signals and is most easily accessible.

Secondly, when in SUL and UL, SRS is transmitted on one carrier and one or more signals of SRS, PUSCH, PUCCH and RACH are transmitted on the other carrier simultaneously, if a sum of powers of simultaneously transmitted signals exceeds $P_{c,max}$, a high priority is given to transmission on PUCCH carrier that carries PUCCH configured by RRC in SUL and UL and a low priority is given to signals transmitted on other carrier that is not the PUCCH carrier, whereby transmission is performed in a manner of lowering the power of the signal of the low priority. Namely, since the PUCCH carrier may be regarded as a main carrier, a UL resource can be given based on the quality of the corresponding carrier. Alternatively, a low priority is given to transmission on PUCCH carrier that carries PUCCH configured by RRC in SUL and UL and a high priority is given to signals transmitted on other carrier that is not the PUCCH carrier, whereby transmission is performed in a manner of lowering the power of the signal of the low priority. This is because a quality of the carrier that is not the PUCCH carrier may need to be monitored with regard to switching the PUCCH carrier.

Yet, the second method is usable only for a case of non-dynamic PUSCH switching. Namely, if PUSCH carrier is changed dynamically, two carriers may be assumed as used simultaneously, it may become ambiguous to prioritize SUL and UL.

Thirdly, when in SUL and UL, SRS is transmitted on one carrier and one or more signals of SRS, PUSCH, PUCCH and RACH are transmitted on the other carrier simultaneously, if a sum of powers of simultaneously transmitted signals exceeds $P_{c,max}$, a high priority is given to an aperiodic signal and a low priority is given to a periodic signal, whereby transmission is performed in a manner of lowering the power of the signal of the low priority.

Fourthly, when in SUL and UL, SRS is transmitted on one carrier and one or more signals of SRS, PUSCH, PUCCH and RACH are transmitted on the other carrier simultaneously, if a sum of powers of simultaneously transmitted signals exceeds $P_{c,max}$, if all signals carried on the two carriers are scheduled by UL/DL grant, a high priority is given to the signal receiving the early grant and a low priority is given to the signal receiving the late grant, whereby transmission is performed in a manner of lowering the power of the signal of the low priority. Namely, since the signal receiving the early grant is already in progress of processing, if it is attempted to change the power due to the signal receiving the late grant, a processing time may fall short.

Signals for power reduction may consider one of the followings.

If the simultaneously transmitted interval corresponds to a portion of the simultaneously transmitted signal, only the power corresponding to the portion can be reduced.

Currently, SRS may be repeatedly transmitted in the same slot and one or more PUSCH/PUCCH may be transmitted in a slot one or more times without being repeatedly. For example, simultaneous transmission of signals transmitted in one slot together with the above signal may overlap through several intervals. Hence, the simultaneously transmitted signal may appear in a manner that an overlapping time interval is not continuous. In case that transmission of one carrier overlaps multiple times with transmission of several signals of the other carrier, power can be reduced in each overlapping interval only. For example, if multiple-time transmission of SRS overlaps with one UL transmission of the other carrier in several intervals, power can be reduced in the overlapping interval only.

If a simultaneously transmitted interval corresponds to a portion of simultaneously transmitted signals, the power may be reduced for the whole transmitted signals. Namely, if power of a partial interval is reduced only, ramping for powers of the rest of signals transmitted in both ends of a power-reduced time resource is required. In such a case, signal distortion occurs in the power ramping interval.

Currently, SRS may be repeatedly transmitted in the same slot and PUSCH/PUCCH may be transmitted multiple times in one slot without being repeatedly. For example, simultaneous transmission of signals transmitted in one slot together with the above signal may overlap through several intervals. Hence, the simultaneously transmitted signal may appear in a manner that an overlapping time interval is not continuous. For example, if multiple transmission of SRS overlaps with one UL transmission of the other carrier through several intervals, powers of all SRS are lowered in case of reducing power of the SRS or total power of one UL signal of another overlapping carrier is lowered in case of reducing power of the UL signal.

Figure 13:
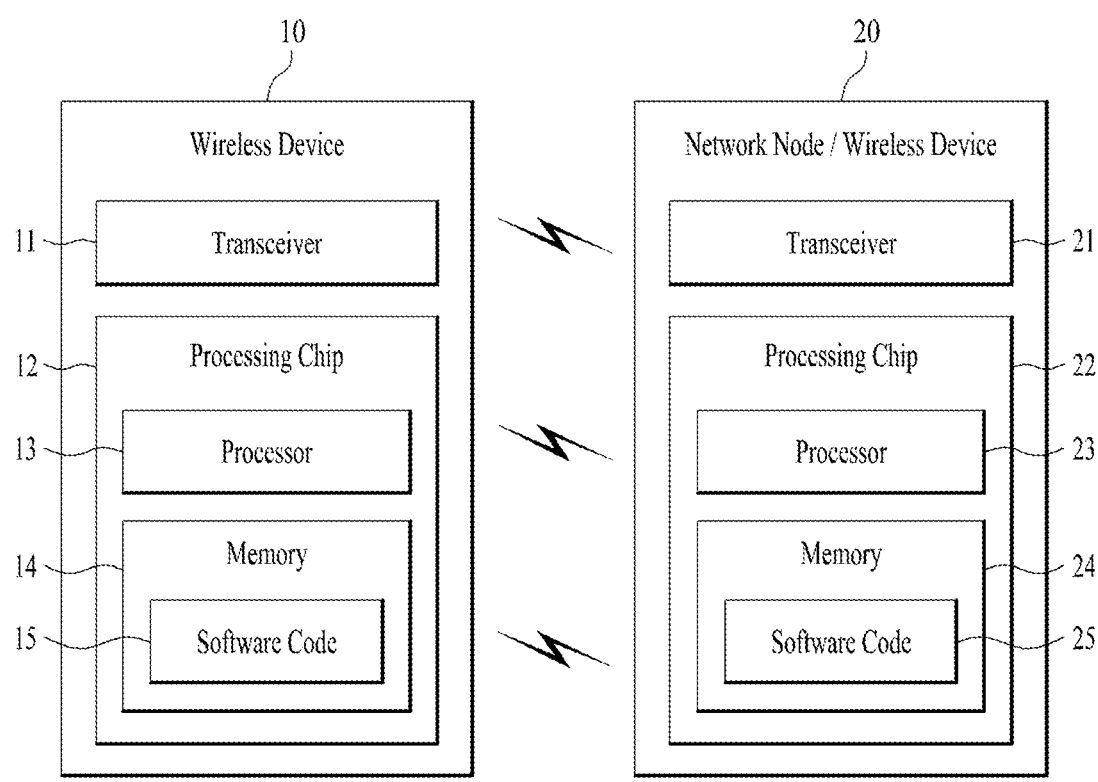
FIG. 13 is a block diagram showing components of a wireless device implementing the present disclosure.

FIG. 13 is a block diagram showing an example of communication between a wireless device 10 and a network node 20. Here, the network node 20 may be substituted with the wireless device 10 of FIG. 13 or a UE.

In the present specification, the wireless device 10 or the network node 20 includes a transceiver 11/21 configured to communicate with one or more other wireless devices, network nodes and/or other elements of a network. The transceiver 11/21 may include one or more transmitters, one or more receivers, and/or one or more communication interfaces.

The transceiver 11/12 may include one or more antennas. The antenna performs a function of transmitting a signal processed by the transceiver 11/12 externally or a function of receiving a wireless signal from outside and forwarding it to a processing chip 12/22. The antenna may be referred to as an antenna port. Each antenna corresponds to a single physical antenna or may be configured with a combination of two or more physical antenna elements. A signal transmitted from each antenna cannot be further resolved by the wireless device 10 or the network node 20. A Reference Signal (RS) transmitted in correspondence to a corresponding antenna defines an antenna from the perspective of the wireless device 10 or the network node 20 and enables the wireless device 10 or the network node 20 to perform channel estimation on the antenna irrespective of whether a channel is a single wireless channel from one physical antenna or a composite channel from a plurality of physical antenna elements including the above antenna. Namely, an antenna is defined in a manner that a channel delivering a symbol on the antenna can be derived from the channel delivering another symbol on the same antenna. If a transceiver supports Multiple Input Multiple Output (MIMO) of transceiving data using a plurality of antennas, it may be connected to two or more antennas.

In the present disclosure, the transceiver 11/12 may support an Rx beamforming and a Tx beamforming. For example, in the present disclosure, the transceiver 11/12 may be configured to perform the functions exampled in FIGS. 7 to 9.

The wireless device 10 or the network node 20 includes the processing chip 12/22. The processing chip 12/22 may include at least one processor such as a processor 13/23 and at least one memory device such as a memory 14/24.

The processing chip 12/22 may control at least one of the methods and/or processes described in the present specification. So to speak, the processing chip 12/22 may be configured to implement at least one or more embodiments disclosed in the present specification.

The processor 13 and 23 includes at least one processor configured to execute the functions of the wireless device 10 or the network node 20 described in the present specification.

For example, one or more processors control the one or more transceivers 11/21 shown in FIG. 13 to transceive information.

The processor 13/23 included in the processing chip 12/22 performs prescribed coding and modulation on a signal and/or data to be transmitted out of the wireless device 10 or the network node 20 and then transmits it to the transceiver 11/21. For example, the processor 13/23 transforms a data column to transmit into K layers through demultiplexing & channel coding, scrambling, modulation and the like. The coded data column may be referred to as a codeword and is equivalent to a transport block that is a data block provided by a MAC layer. One Transport Block (TB) is coded into one codeword, and each codeword is transmitted to a receiving device in form of one or more layers. The transceiver 11/12 may include an oscillator for frequency upconversion. The transceiver 11/12 may include $N_t$ Tx antennas, where $N_t$ is a positive integer equal to or greater than 1.

The processing chip 12/22 includes a memory 14/24 configured to store data, programmable software code and/or other information to execute the embodiments described in the present specification.

So to speak, in an embodiment according to the present specification, when the memory 14/24 is executed by at least one processor such as the processor 13/23, the memory 14/24 stores a software code 15/25 including commands for enabling the processor 13/23 to execute processes controlled by the processor 13/23 entirely or in part or commands for executing the embodiments described in the present specification.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS in the present disclosure. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present disclosure without departing from the spirit or scope of the disclosure. Therefore, the above-mentioned detailed description must be considered only for illustrative purposes instead of restrictive purposes. The scope of the present disclosure must be decided by a rational analysis of the claims, and all modifications within equivalent ranges of the present disclosure are within the scope of the present disclosure.

Although the aforementioned method of transmitting a control channel for multi-carrier support in a next generation communication system and apparatus therefor are described by focusing on examples applying to the 3GPP LTE system, they are applicable to various wireless communication systems as well as to the 3GPP LTE system.

What is claimed is:

1. A method of receiving a downlink control information from a base station by a user equipment configured with a first uplink carrier in a wireless communication system, the method comprising:

receiving, through a higher layer, configuration information of a second uplink carrier;

receiving the downlink control information from the base station, wherein the downlink control information is for transmission of an uplink signal through the first uplink carrier or the second uplink carrier; and transmitting the uplink signal to the base station based on the downlink control information, wherein the downlink control information includes an indicator information indicating either the first uplink carrier or the second uplink carrier, and wherein the indicator information is located in a last bit of the downlink control information, after any padding bits.

2. The method of claim 1, wherein a subcarrier spacing of the second uplink carrier is different from that of the first uplink carrier.

3. The method of claim 1, further comprising receiving configuration information regarding availability of transmission of the uplink signal through the second uplink carrier.

4. A user equipment configured to operate with a first uplink carrier in a wireless communication system, the user equipment comprising:

at least one transceiver;

at least one processor; and at least one computer memory operable connected to the at least one processor and storing instructions that, based on being executed by the at least one processor, perform operations comprising:

receiving, through a higher layer via the at least one transceiver, configuration information of a second uplink carrier;

receiving downlink control information from a base station via the at least one transceiver, wherein the downlink control information is for transmission of an uplink signal through the first uplink carrier or the second uplink carrier; and transmitting, via the at least one transceiver, the uplink signal to the base station based on the downlink control information, wherein the downlink control information includes an indicator information indicating either the first uplink carrier or the second uplink carrier, and wherein the indicator information is located in a last bit of the downlink control information, after any padding bits.

5. The user equipment of claim 4, wherein a subcarrier spacing of the second uplink carrier is different from that of the first uplink carrier.

6. The user equipment of claim 4, wherein the operations further comprise receiving configuration information regarding availability of transmission of the uplink signal through the second uplink carrier.

7. A method of transmitting, by a base station, a downlink control information to a user equipment configured with a first uplink carrier in a wireless communication system, the method comprising:

transmitting, through a higher layer, configuration information of a second uplink carrier;

transmitting the downlink control information to the user equipment, wherein the downlink control information is for transmission of an uplink signal through the first uplink carrier or the second uplink carrier; and receiving the uplink signal from the user equipment based on the downlink control information, wherein the downlink control information includes an indicator information indicating either the first uplink carrier or the second uplink carrier, and wherein the indicator information is located in a last bit of the downlink control information, after any padding bits.

8. The method of claim 7, wherein a subcarrier spacing of the second uplink carrier is different from that of the first uplink carrier.

9. The method of claim 7, further comprising transmitting configuration information regarding availability of transmission of the uplink signal through the second uplink carrier.

10. A base station configured to transmit a downlink control information to a user equipment configured with a first uplink carrier in a wireless communication system, the base station comprising:

at least one transceiver;

at least one processor; and at least one computer memory operably connected to the at least one processor and storing instructions that, based on being executed by the at least one processor, perform operations comprising:

transmitting, through a higher layer via the at least one transceiver, configuration information of a second uplink carrier;

transmitting downlink control information to the user equipment via the at least one transceiver, wherein the downlink control information is for transmission of an uplink signal through the first uplink carrier or the second uplink carrier; and receiving, via the at least one transceiver, the uplink signal from the user equipment based on the downlink control information, wherein the downlink control information includes an indicator information indicating either the first uplink carrier or the second uplink carrier, and wherein the indicator information is located in a last bit of the downlink control information, after any padding bits.

11. The base station of claim 10, wherein a subcarrier spacing of the second uplink carrier is different from that of the first uplink carrier.

12. The base station of claim 10, wherein the operations further comprise: transmitting, via the at least one transceiver, configuration information regarding availability of transmission of the uplink signal through the second uplink carrier.

* * * * *